(12) United States Patent
Kato et al.

(10) Patent No.: US 12,277,281 B2
(45) Date of Patent: Apr. 15, 2025

(54) INPUT DEVICE

(71) Applicant: Wacom Co., Ltd., Saitama (JP)

(72) Inventors: So Kato, Saitama (JP); Tatsunosuke Tobita, Saitama (JP); Shigeru Yamashita, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/296,294

(22) Filed: Apr. 5, 2023

(65) Prior Publication Data

US 2023/0244332 A1   Aug. 3, 2023

Related U.S. Application Data

(63) Continuation of application No. PCT/JP2021/029782, filed on Aug. 13, 2021.

(30) Foreign Application Priority Data

Nov. 2, 2020   (JP) .................................. 2020-183425

(51) Int. Cl.
*G06F 3/038*   (2013.01)
*G06F 3/0338*   (2013.01)
(Continued)

(52) U.S. Cl.
CPC ............ *G06F 3/038* (2013.01); *G06F 3/0338* (2013.01); *G06F 3/0362* (2013.01); *H01H 13/14* (2013.01); *H01H 25/04* (2013.01)

(58) Field of Classification Search
CPC ...... G06F 3/038; G06F 3/0338; G06F 3/0362; G06F 3/0205; G06F 3/0393; G06F 3/041; H01H 13/14; H01H 25/04; H01H 25/041
See application file for complete search history.

(56) References Cited

U.S. PATENT DOCUMENTS

| | | | | |
|---|---|---|---|---|
| 2006/0256090 | A1* | 11/2006 | Huppi | A63F 13/92 |
| | | | | 345/173 |
| 2016/0188016 | A1* | 6/2016 | Munakata | G06F 3/04162 |
| | | | | 345/179 |

(Continued)

FOREIGN PATENT DOCUMENTS

| JP | 2004033371 A | 2/2004 |
|---|---|---|
| JP | 2016126503 A | 7/2016 |

(Continued)

OTHER PUBLICATIONS

International Search Report, mailed Oct. 26, 2021, for International Patent Application No. PCT/JP2021/029782. (5 pages) (with English Translation).

*Primary Examiner* — Amit Chatly
*Assistant Examiner* — Chayce R Bibbee
(74) *Attorney, Agent, or Firm* — Seed IP Law Group LLP

(57) ABSTRACT

Disclosed is an input device including a position detection sensor, an operation including a position indicator which, in operation, indicates a position through interaction with the position detection sensor and accepts a predetermined operation, the operation part being disposed on an input surface that serves as a position detection region of the position detection sensor, an operation detection circuit that, in operation, detects the operation accepted by the operation part, based on the interaction between the position indicator of the operation part and the position detection sensor, and a control signal output circuit that, in operation, outputs a control signal corresponding to the operation detected by the operation detection circuit.

18 Claims, 12 Drawing Sheets

(51) Int. Cl.
*G06F 3/0362* (2013.01)
*H01H 13/14* (2006.01)
*H01H 25/04* (2006.01)

(56) References Cited

U.S. PATENT DOCUMENTS

2018/0032155 A1\* 2/2018 Shirai .................... G06F 3/0383
2021/0021264 A1\* 1/2021 Ji ........................ H03K 17/9622

FOREIGN PATENT DOCUMENTS

WO    WO 2014141893 A1   9/2014
WO    WO 2018109833 A1   6/2018

\* cited by examiner

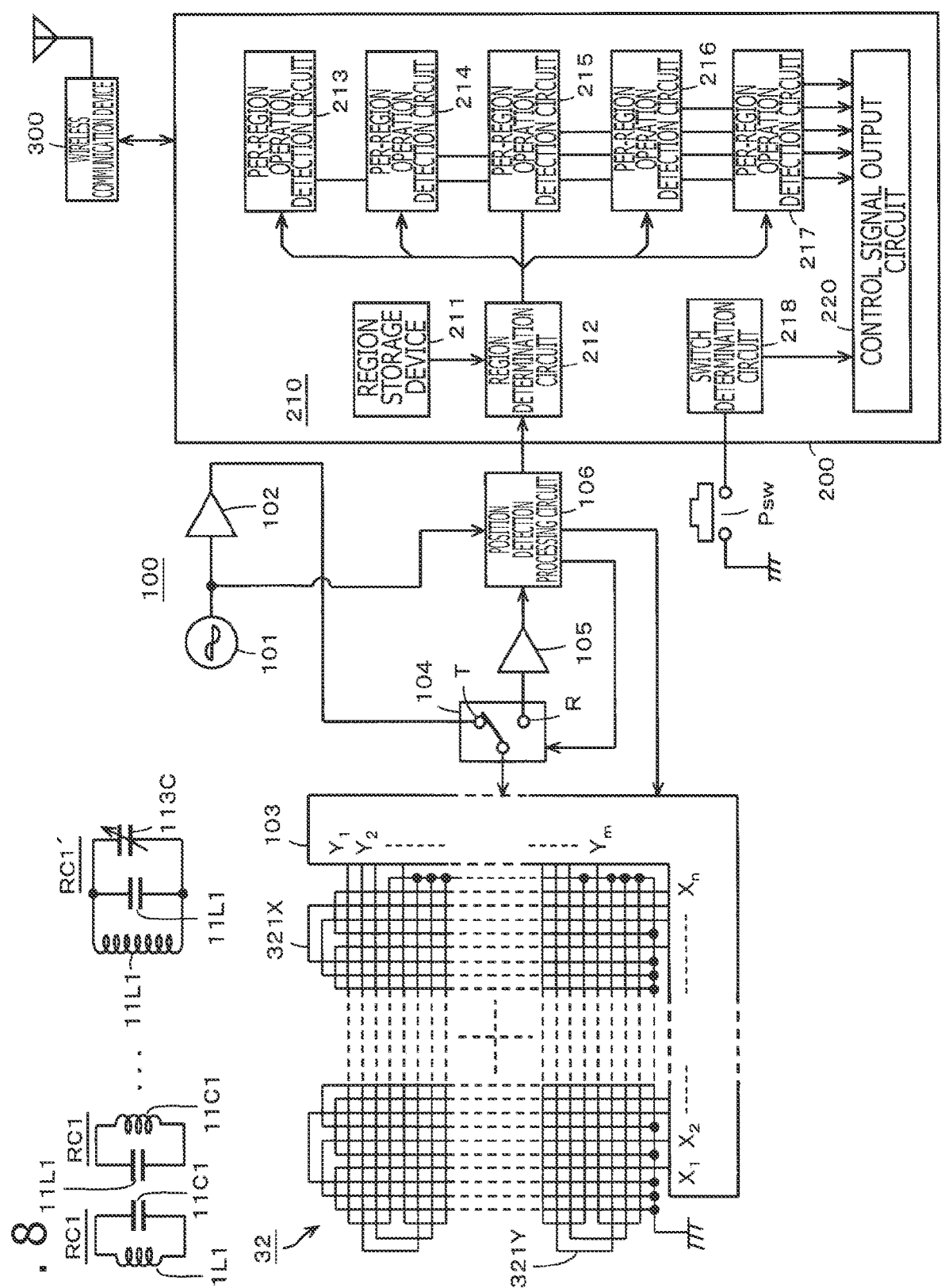

FIG.9

| DETECTION REGION | DETECTION RANGE | DETECTION TARGET OPERATION PART | DETECTION APP |
|---|---|---|---|
| DA | (xa, ya) ~ (xb, yb) | FOUR PUSH BUTTON OPERATION PARTS | APR1 |
| DB | (xc, yc) ~ (xd, yd) | TWO PUSH BUTTON OPERATION PARTS | APR2 |
| DC | (xe, ye) ~ (xf, yf) | FINGER INSERTION OPERATION PART (LEFT THUMB) | APR3 |
| DD | (xg, yg) ~ (xh, yh) | FINGER INSERTION OPERATION PART (RIGHT THUMB) | APR4 |
| DE | (xi, yi) ~ (xj, yj) | CROSS-SHAPED OPERATION PART | APR5 |

INPUT DEVICE

BACKGROUND

Technical Field

The present disclosure relates to an input device that supplies a control signal corresponding to an operation made by a user, to an electronic device such as a personal computer or a game machine.

Description of the Related Art

Input devices called game controllers or gamepads are generally used for input into computer devices, especially input into video games. This type of input devices includes not only an array of simple push buttons but also a plurality of operation parts such as a joystick, a directional pad, and operation keys that can input analog values, allowing input that matches versatile uses (see, for example, Japanese Patent Laid-Open No. 2004-33371).

In this type of conventional input devices, each of a plurality of operation parts includes an independent operation mechanism part, and each of these independent operation mechanism parts is positioned and disposed in one casing.

In this way, conventional input devices of this type need to be configured by disposing an independent operation mechanism part of each operation part at a predetermined position of the casing. This problematically complicates a configuration of the independent operation mechanism part of each operation part and complicates the entire configuration of the input device, resulting in high price.

BRIEF SUMMARY

It is an object of the present disclosure is to provide an input device that can solve the problems described above.

To solve the abovementioned problems, there is provided an input device including a position detection sensor, an operation part including a position indicator that, in operation, indicates a position through interaction with the position detection sensor and accepts a predetermined operation, the operation part being disposed on an input surface that serves as a position detection region of the position detection sensor, an operation detection circuit that, in operation, detects the operation accepted by the operation part, based on the interaction between the position indicator of the operation part and the position detection sensor, and a control signal output circuit that, in operation, outputs a control signal corresponding to the operation detected by the operation detection circuit.

The input device having the configuration described above includes the operation part disposed on the input surface of the position detection sensor, and, in operation, detects an operation mode predetermined in the operation part, based on the interaction between the position detection sensor and the position indicator of the operation part.

Therefore, since the input device having the configuration described above can be configured just by disposing, on the position detection sensor, the operation part that, in operation, accepts a user operation in a predetermined mode, and disposing the operation detection circuit and the control signal output circuit in the position detection sensor, the input device can be manufactured at a low cost with a simple configuration.

BRIEF DESCRIPTION OF THE SEVERAL VIEWS OF THE DRAWINGS

FIG. 8 is a diagram for describing an example of an electronic circuit configuration of the input device according to the first embodiment of the present disclosure;

FIG. 9 is a diagram for describing part of the example of the electronic circuit configuration of the input device according to the first embodiment of the present disclosure;

DETAILED DESCRIPTION

An input device according to an embodiment of the present disclosure is described below with reference to the drawings.

First Embodiment

Figure 1:
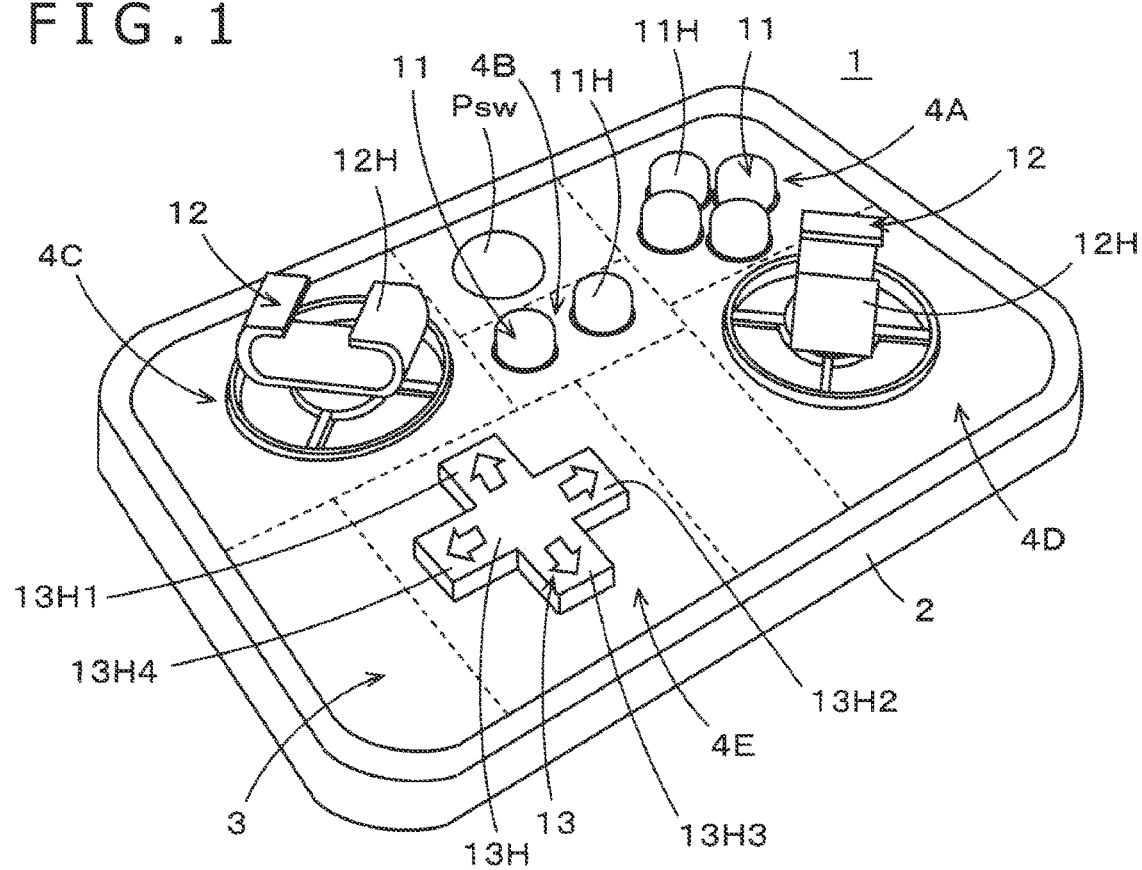
FIG. 1 is a view for describing an overview of an input device according to a first embodiment of the present disclosure.

FIG. 1 is a perspective view of an input device 1 according to a first embodiment of the present disclosure, as viewed obliquely from above. The input device 1 according to this example is assumed to be used as a game controller.

The input device 1 according to the present embodiment has a thin plate-like appearance and is configured such that an input device main body 3 is housed in a frame case 2 which has an opening on its upper side.

The input device 1 according to the present embodiment includes a plurality of operation input acceptance parts which, in this example, accept operations with different modes and which are each arranged in a region (see a dotted lines in FIG. 1) that does not overlap with the other regions indicated by dotted lines in FIG. 1 on an upper surface of the input device main body 3. In the example of FIG. 1, the input device 1 includes five operation input acceptance parts 4A, 4B, 4C, 4D, and 4E. The dotted lines in FIG. 1 are drawn for the sake of convenience in order to clearly indicate that the plurality of operation input acceptance parts are arranged in regions that do not overlap with each other, and the boundaries of the dotted lines are not actually drawn on the upper surface of the input device main body 3.

In the input device 1 according to this example, the input device main body 3 further includes a conventional push button switch Psw in a different region from the regions in which the five operation input acceptance parts 4A, 4B, 4C, 4D, and 4E are arranged.

Each of the operation input acceptance parts 4A, 4B, 4C, 4D, and 4E includes one or more operation parts and can accept an operation made in any of the one-dimensional, two-dimensional, and three-dimensional spaces.

In the present embodiment, an operation mode that can be accepted is determined in advance for each of the five operation input acceptance parts 4A, 4B, 4C, 4D, and 4E according to the number of operation parts and the operation spaces of the operation parts. In this case, the operation mode to be accepted by each of the operation input acceptance parts 4A, 4B, 4C, 4D, and 4E is not limited to one type, and a plurality of types of operation modes are defined.

The input device 1 detects the operation mode accepted by each of the operation input acceptance parts 4A, 4B, 4C, 4D, and 4E and transmits a different control signal according to the detected operation mode.

In the example of FIG. 1, a total of four push button operation parts 11 are arranged in the region of the operation input acceptance part 4A on the upper surface of the input device main body 3 of the input device 1. Specifically, two of the push button operation parts 11 are arranged in a lateral direction, and two of the push button operation parts 11 are arranged in a longitudinal direction, so that the four push button operation parts 11 form a rhombus. Each of the push button operation parts 11 includes an operation element 11H which accepts an operation for changing the position in a height direction perpendicular to the upper surface of the input device main body 3. Since the operation accepted by each push button operation part 11 is an operation for changing only the position in the height direction without changing the position on the upper surface of the input device main body 3, the operation accepted by each push button operation part 11 is defined as an operation in one-dimensional space here.

In the region of the operation input acceptance part 4B on the upper surface of the input device main body 3, two push button operation parts 11 are arranged side by side in the lateral direction.

In each of the regions of the operation input acceptance parts 4C and 4D on the upper surface of the input device main body 3, one finger insertion operation part 12 is disposed. The finger insertion operation part 12 according to this example includes an operation element 12H which has a portion into which a user can insert a finger, for example, a thumb. The finger insertion operation part 12 is configured as a three-dimensional operation part capable of accepting an operation made by a user to change the position of the operation element 12H in the longitudinal direction and the lateral direction on the upper surface of the input device main body 3 as well as an operation made by the user to change the position of the operation element 12H in the height direction perpendicular to the upper surface of the input device main body 3.

In the region of the operation input acceptance part 4E on the upper surface of the input device main body 3 of the input device 1, a cross-shaped operation part 13 is disposed. In the present embodiment, the cross-shaped operation part 13 includes a cross-shaped operation element 13H which crosses the longitudinal direction and the lateral direction on the upper surface of the input device main body 3.

The cross-shaped operation part 13 is configured such that, when the user presses one of four ends, that is, an upper end 13H1, a right end 13H2, a lower end 13H3, and a left end 13H4 (see FIG. 1), of the cross-shaped operation element 13H, the cross-shaped operation element 13H seesaws in the longitudinal direction and the lateral direction on the upper surface of the input device main body 3 with the intersection position of the cross as a fulcrum.

The cross-shaped operation part 13 according to this example may also be configured as a two-dimensional operation part. In the present embodiment, however, as described later, the cross-shaped operation part 13 is configured as a three-dimensional operation part capable of changing the height position of each end in response to the operation on the upper end 13H1, the lower end 13H3, the left end 13H4, or the right end 13H2 of the cross-shaped operation element 13H, as with the push button operation part 11.

Figure 3:
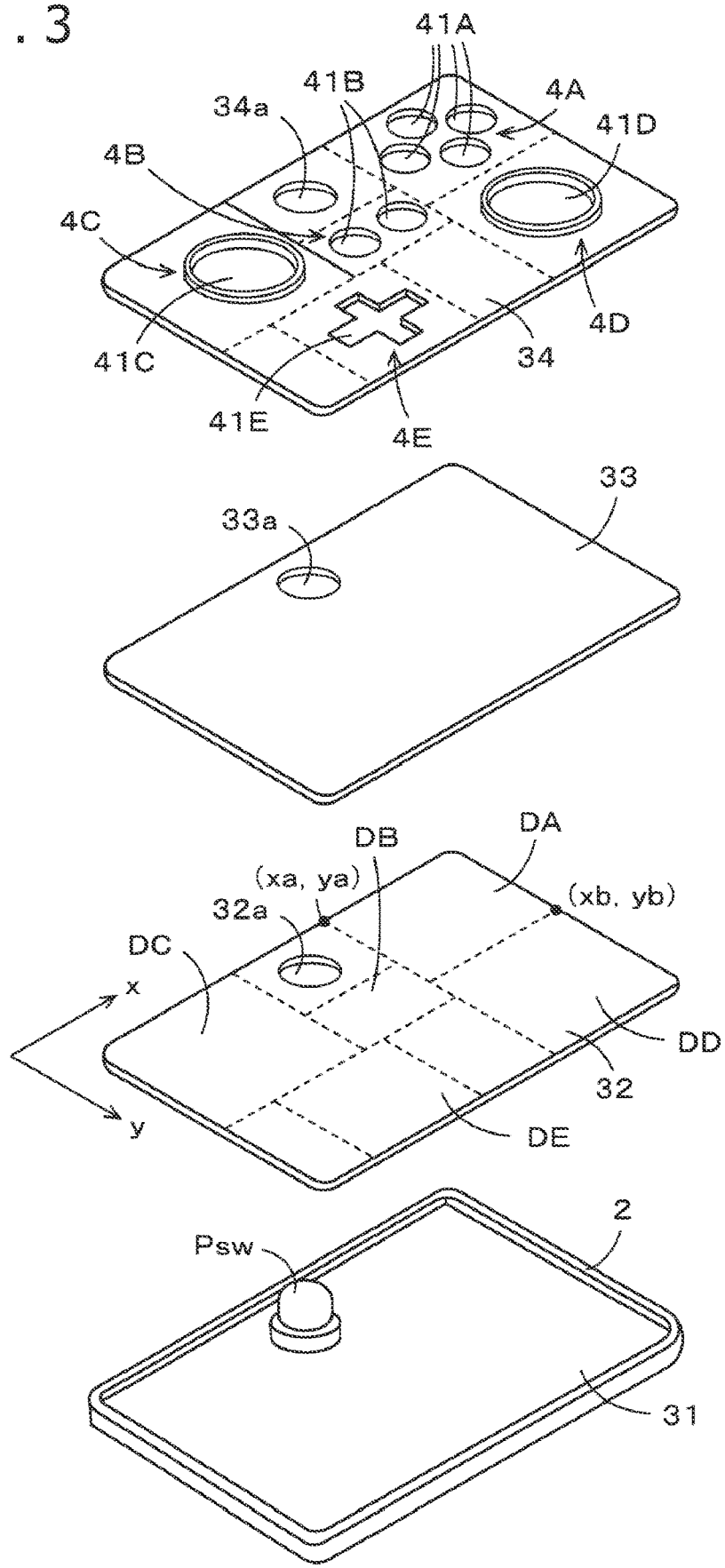
FIG. 3 is an exploded perspective view for describing an example of a configuration of the input device according to the first embodiment of the present disclosure.

FIG. 3 is an exploded perspective view for describing an example of a configuration of the input device 1, particularly the input device main body 3, according to the present embodiment. It is noted that, in FIG. 3, the input device main body 3 is illustrated with the operation parts 11, 12, and 13 of the operation input acceptance parts 4A, 4B, 4C, 4D, and 4E removed.

The input device main body 3 according to the present embodiment includes a position detection sensor 32, a protective cover 33, and an operation part holding member 34 which are stacked on a circuit board 31.

As illustrated in FIG. 3, the circuit board 31 is housed in a bottom of the frame case 2. As described later, an electronic circuit (see FIG. 8) including, for example, a position detection circuit 100, an operation information processing circuit 200, and a wireless communication device 300 is formed on the circuit board 31. The conventional push button switch Psw is also disposed at a predetermined position on the circuit board 31.

The position detection sensor 32 is disposed on the circuit board 31 in such a manner as to be superimposed thereon. The position detection sensor 32 according to this example is configured as a position detection sensor of an electromagnetic induction type. In this example, the position detection sensor 32 includes a plurality of loop coils arranged on a flexible substrate. The upper surface of the position detection sensor 32 is covered and protected by the protective cover 33. In the present embodiment, through holes 32a and 33a through which the push operation part of the push button switch Psw disposed on the circuit board 31 is to be inserted are respectively formed in the position detection sensor 32 and the protective cover 33.

The plurality of loop coils of the position detection sensor 32 are electrically connected to the position detection circuit 100 by, for example, the flexible substrate, not illustrated, and the position detection circuit 100 can detect the position indicated by a position indicator in a position detection region of the position detection sensor 32.

In the present embodiment, the operation part holding member 34 is superimposed on the position detection sensor 32 with the protective cover 33 interposed therebetween, in such a manner as to overlap with the entire position detection region of the position detection sensor 32. The upper surface of the operation part holding member 34 serves as the upper surface of the input device main body 3, and the operation input acceptance parts 4A, 4B, 4C, 4D, and 4E described above are formed on the operation part holding member 34. In the present embodiment, a through hole 34a through which the push operation part of the push button switch Psw disposed on the circuit board 31 is to be inserted is also formed in the operation part holding member 34.

As illustrated in FIG. 3, the operation part holding member 34 includes recessed portions 41A, 41B, 41C, 41D, and 41E which are respectively formed in the regions of the operation input acceptance parts 4A, 4B, 4C, 4D, and 4E on the upper surface of the operation part holding member 34. Each of the recessed portions 41A, 41B, 41C, 41D, and 41E forms a space for holding and fixing a corresponding one of the operation parts 11, 12, and 13 of the operation input acceptance parts 4A, 4B, 4C, 4D, and 4E.

Further, the recessed portions 41C and 41D, each of which holds and fixes the finger insertion operation part 12, have a circular shape and are respectively formed in the region of the operation input acceptance part 4C and the region of the operation input acceptance part 4D of the operation part holding member 34. Further, the recessed portion 41E, which has a cross shape and corresponds to the cross-shaped operation element 13H, is formed in the region of the operation input acceptance part 4E of the operation part holding member 34.

In the present embodiment, moreover, the push button operation parts 11, the finger insertion operation parts 12, and the cross-shaped operation part 13 each include a position indicator for the position detection sensor 32.

In the present embodiment, since the position detection sensor 32 is of an electromagnetic induction type, the position indicator for the position detection sensor 32, which is included in each of the push button operation parts 11, the finger insertion operation parts 12, and the cross-shaped operation part 13, is a position indication coil that interacts with the position detection sensor 32 through electromagnetic induction coupling. Each of the position indication coils is connected to a corresponding capacitor to constitute a resonant circuit, thereby interacting with the position detection sensor 32. In this case, in the present embodiment, the frequencies of the resonant circuits are different from each other among the different position indication coils. With this frequency difference, the position detection sensor 32 can detect which position indication coil the position detection sensor 32 is interacting with.

Each push button operation part 11 includes one position indication coil since it suffices that the push button operation part 11 can accept an operation made in the height direction, which is an operation made in the one-dimensional space, and indicate the operation. By contrast, the finger insertion operation parts 12 and the cross-shaped operation part 13 each include a plurality of position indication coils, in this example, four position indication coils, since they need to accept operations made in the three-dimensional space in the longitudinal and lateral directions and the height direction on the upper surface of the input device main body 3. In other words, the number of position indication coils included in each of the operation parts 11 to 13 is determined to correspond to the operation modes that can be accepted by each of the operation parts 11 to 13.

Figure 2:
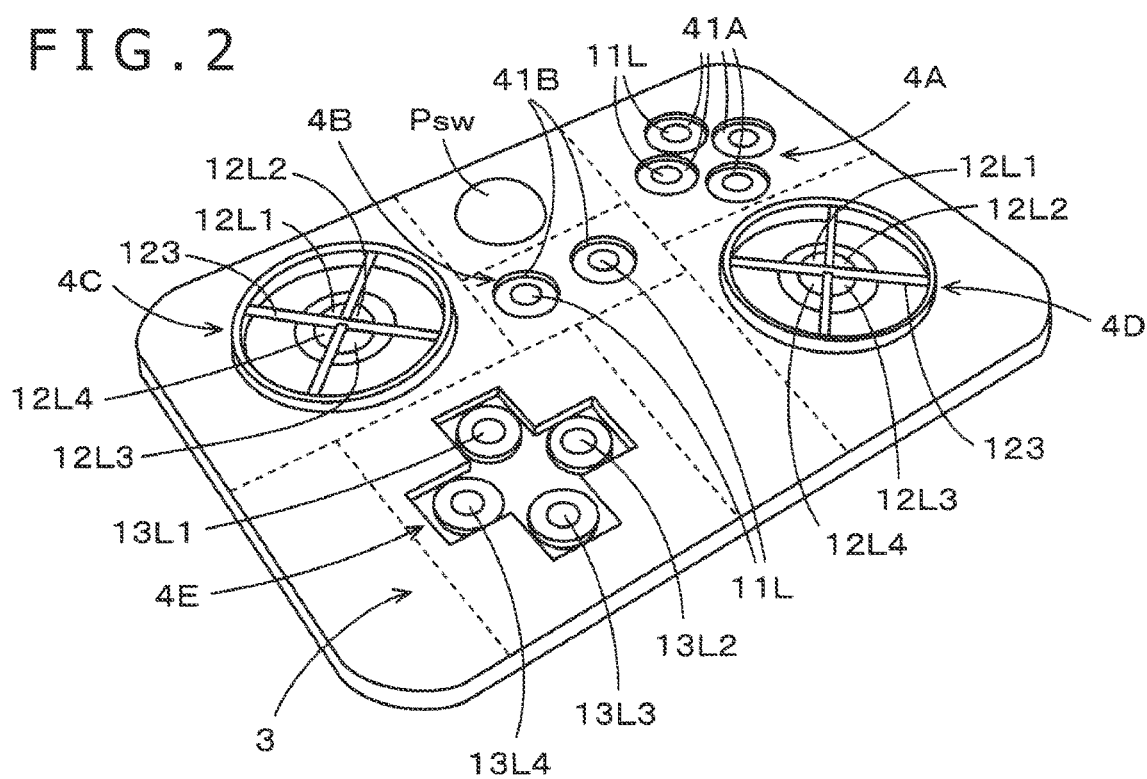
FIG. 2 is a view for describing a main portion of the input device according to the first embodiment of the present disclosure.

FIG. 2 is a view illustrating an example of the arrangement of the position indication coils included in the operation parts 11, 12, and 13 of the operation input acceptance parts 4A, 4B, 4C, 4D, and 4E on the operation part holding member 34. Specifically, FIG. 2 illustrates the arrangement of the position indication coils with the operation elements 11H, 12H, and 13H of the operation parts 11, 12, and 13 of the operation input acceptance parts 4A, 4B, 4C, 4D, and 4E removed.

Example of Configuration of Push Button Operation Parts 11

Each push button operation part 11 includes one position indication coil 11L as described above. As illustrated in FIG. 2, the position indication coil 11L is, in this example, disposed in the substantially center of each of the four circular recessed portions 41A in the region of the operation input acceptance part 4A of the operation part holding member 34 and each of the two circular recessed portions 41B in the region of the operation input acceptance part 4B of the operation part holding member 34. Further, the position indication coil 11L is disposed in each push button operation part 11 to be movable in the height direction, which is the direction perpendicular to the upper surface of the operation part holding member 34, in response to a pressing operation of the operation element 11H.

Figure 4A:
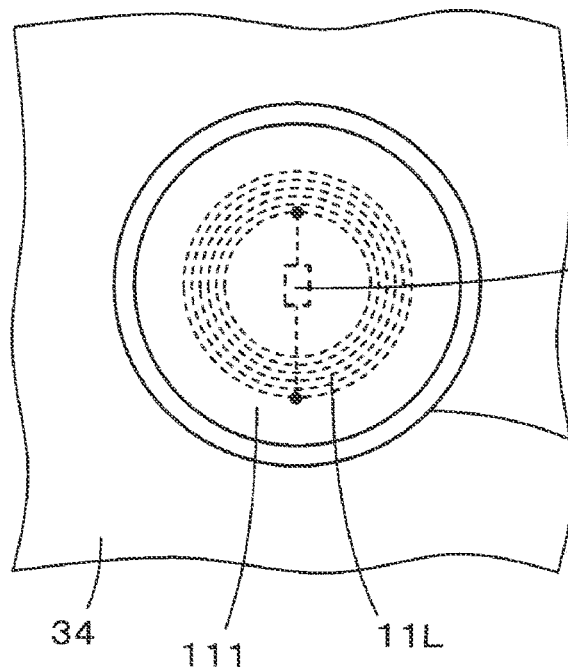
FIGS. 4A and 4B are views for describing an example of an operation part used in the input device according to the first embodiment of the present disclosure.
Figure 4B:
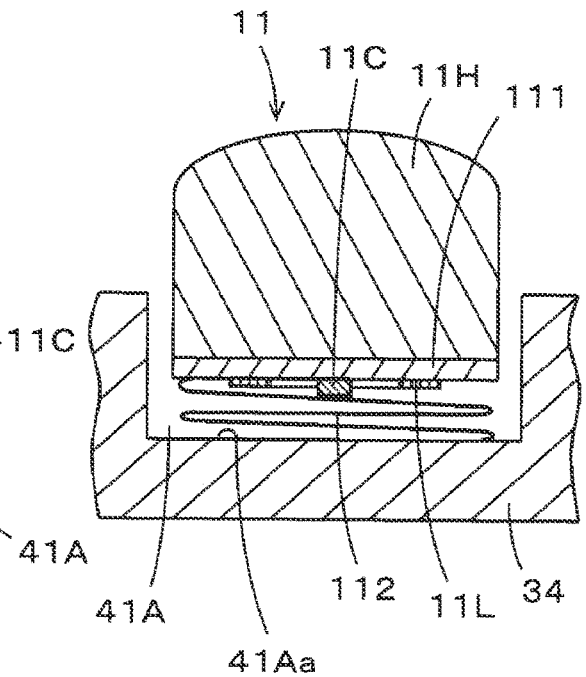

FIGS. 4A and 4B are views for describing an example of a configuration of the push button operation part 11. The push button operation part 11 illustrated in FIGS. 4A and 4B is the one disposed in each of the recessed portions 41A in the region of the operation input acceptance part 4A on the upper surface of the operation part holding member 34. Since the push button operation part 11 disposed in each of the recessed portions 41B in the region of the operation input acceptance part 4B has a similar configuration, the description thereof is omitted here.

FIG. 4A is a view of the push button operation part 11 as viewed from right above in the direction perpendicular to the upper surface of the operation part holding member 34, with the operation element 11H of the push button operation part 11 removed. FIG. 4B is a view of a longitudinal cross section of the push button operation part 11 (a cross section cut along a plane in the direction perpendicular to the upper surface of the operation part holding member 34) with the operation element 11H attached.

In this example, the position indication coil 11L is disposed on a lower surface of a circular flexible substrate 111 which has a slightly smaller diameter than an inner diameter of the circular recessed portion 41A. In this case, the position indication coil 11L, which is a wire wound one or more times, is deposited on the lower surface of the flexible substrate 111. It is noted that the position indication coil 11L may be formed on the lower surface of the flexible substrate 111 by winding a conductive pattern one or more times.

As illustrated in FIGS. 4A and 4B, a winding start end and a winding finish end of the position indication coil 11L are connected to one end and the other end of a capacitor 11C which is disposed on the lower surface of the flexible substrate 111. With this configuration, the position indication coil 11L and the capacitor 11C constitute a resonant circuit.

An upper surface of the flexible substrate 111 adheres to an end surface of the operation element 11H, which has, in this example, a cylindrical shape, with an adhesive, for example. An elastic member which is, in this example, a coil spring 112, is disposed between the flexible substrate 111, which adheres to the operation element 11H, and a bottom surface 41Aa of the recessed portion 41A of the operation part holding member 34. The coil spring 112 is a return spring that is elastically displaced when the operation element 11H is pressed in the height direction perpendicular to the bottom surface 41Aa and that returns the operation element 11H to its original height position when the pressing force disappears.

Each push button operation part 11 is configured as described above. With this configuration, when the user presses the operation element 11H, the distance between the position indication coil 11L and the bottom surface 41Aa of the recessed portion 41A, that is, the height position, can be changed.

In the present embodiment, as described later, the position detection sensor 32 of the electromagnetic induction type, which is disposed below the operation part holding member 34, transmits a signal to the resonant circuit constituted by the position indication coil 11L and the capacitor 11C of the push button operation part 11 and receives a signal from the resonant circuit.

In the present embodiment, as described above, the position detection sensor 32 of the electromagnetic induction type is electromagnetically coupled to the position indication coil 11L of the push button operation part 11 and receives a signal fed back from the position indication coil 11L. In this case, the strength of the electromagnetic coupling between the position detection sensor 32 and the position indication coil 11L changes according to the height position of the position indication coil 11L. Therefore, the level of the signal transmitted from the position indication coil 11L and received by the position detection sensor 32 changes according to the height position of the position indication coil 11L.

Figure 5A:
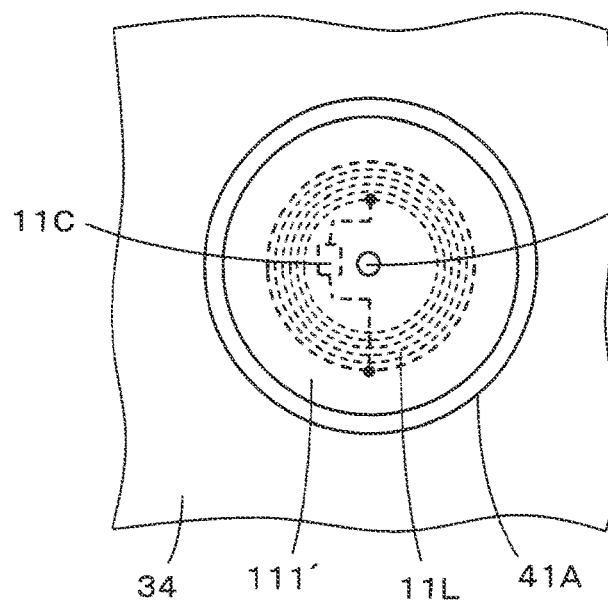
FIGS. 5A and 5B are views for describing another example of the operation part used in the input device according to the first embodiment of the present disclosure.
Figure 5B:
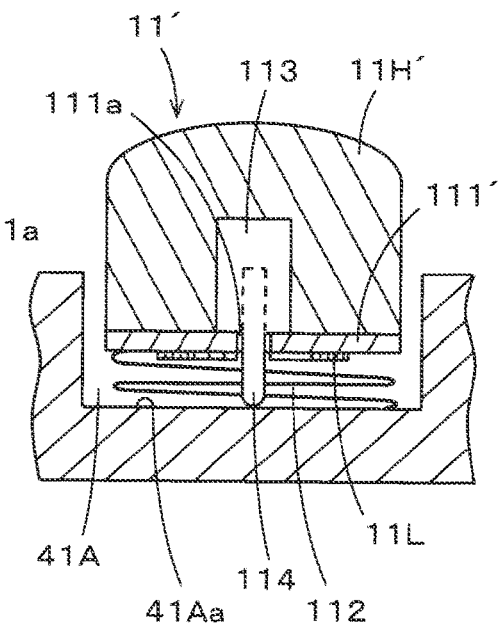

FIGS. 5A and 5B are views for describing another example of the configuration of the push button operation part 11. With this configuration example, a pressure applied when the operation element 11H of the push button operation part 11 is pressed can be detected by the position detection circuit 100 described later. In the example of FIGS. 5A and 5B, the same components as those in FIGS. 4A and 4B are denoted with the same reference signs, and the detailed description thereof is omitted.

That is, in a push button operation part 11' in the example of FIGS. 5A and 5B, a through hole 111a is formed at a center position of a flexible substrate 111'. Further, as illustrated in FIGS. 5A and 5B, the capacitor 11C is disposed at a position avoiding the position of the through hole 111a on the flexible substrate 111'.

In this example, a pressure detector 113 is disposed at a center of a surface side where an operation element 11H' is joined to the flexible substrate 111'. In this example, the pressure detector 113 uses a variable capacitor with a well-known configuration described in, for example, Japanese Patent Laid-Open No. 2016-126503. The variable capacitor constituted by the pressure detector 113 is connected in parallel to the position indication coil 11L and the capacitor 11C, thereby constituting part of a resonant circuit. A pressure transmission member 114 is fitted to the pressure detector 113 through the through hole 111a.

Therefore, when the user presses the push button operation part 11', the applied pressure is transmitted to the pressure detector 113 via the pressure transmission member 114 and detected as a change in the capacitance of the variable capacitor.

The push button operation part 11' in the example of FIGS. 5A and 5B is configured as described above. Therefore, when the user presses the operation element 11H', the height, that is, the distance between the position indication coil 11L and the bottom surface 41Aa of the recessed portion 41A, changes, and the user's pressing pressure on the operation element 11H' is detected as a change in the capacitance of the variable capacitor of the pressure detector 113.

Example of Configuration of Finger Insertion Operation Parts 12

Figure 6A:
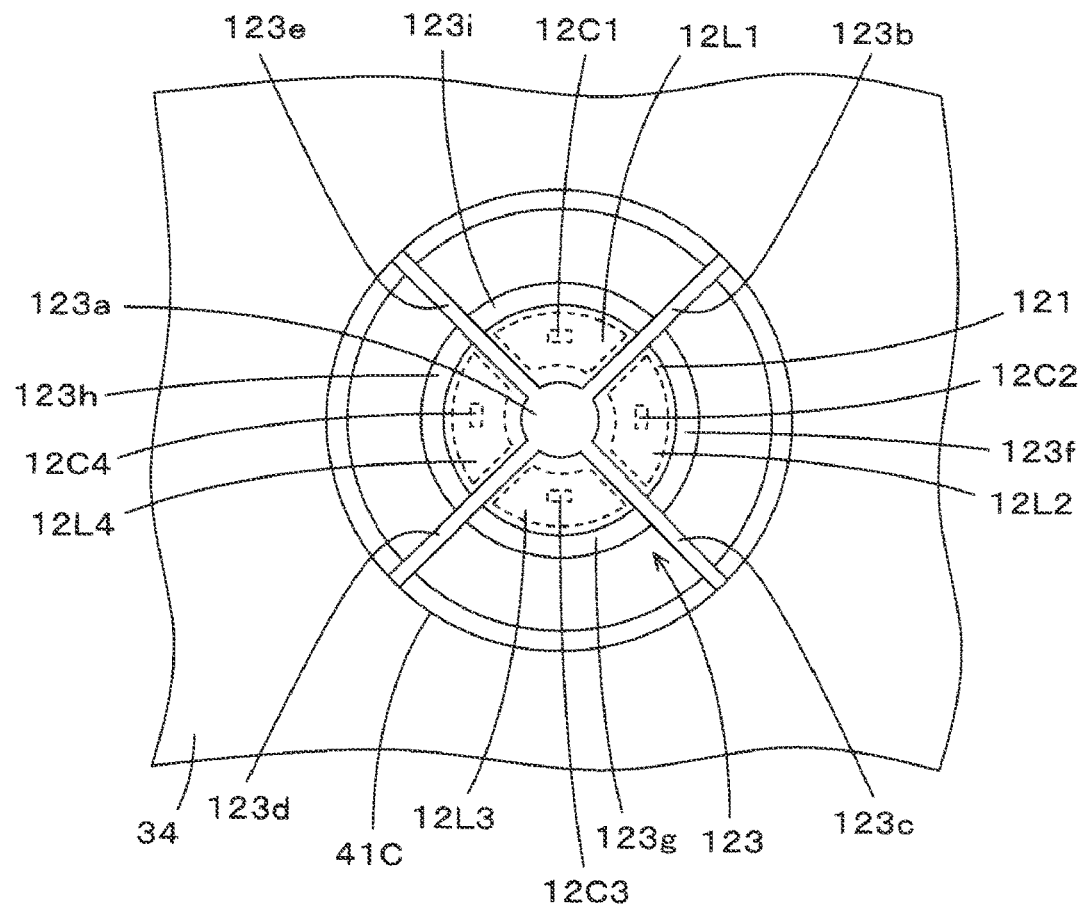
FIGS. 6A and 6B are views for describing another example of the operation part used in the input device according to the first embodiment of the present disclosure.

As illustrated in FIGS. 2 and 6A, each finger insertion operation part 12 includes four position indication coils 12L1, 12L2, 12L3, and 12L4.

Figure 6B:
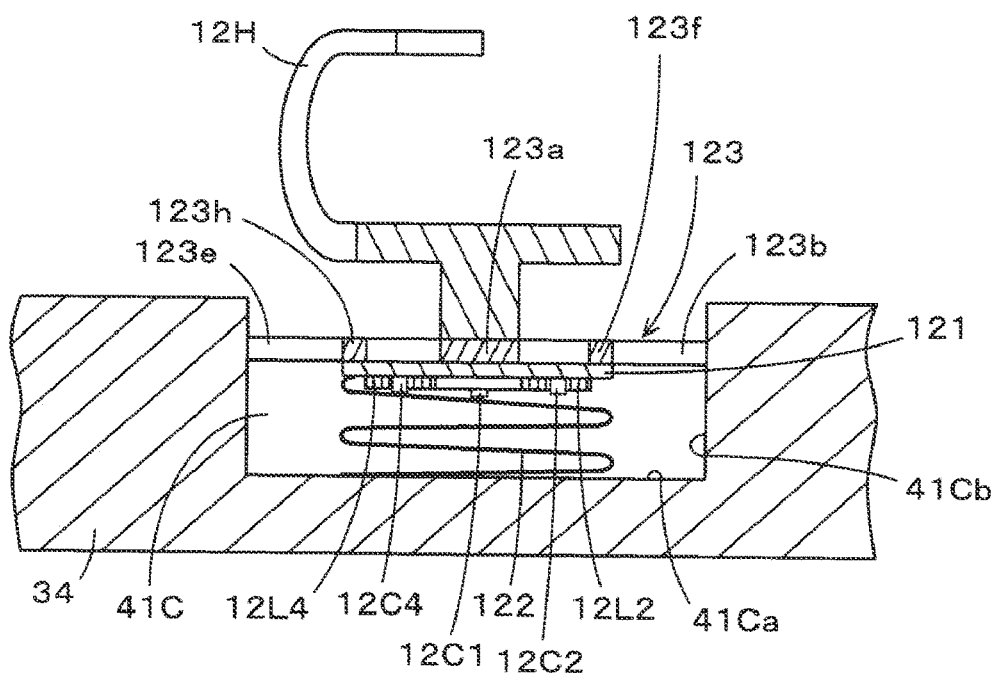

FIGS. 6A and 6B are views for describing an example of a configuration of the finger insertion operation part 12. The finger insertion operation part 12 illustrated in FIGS. 6A and 6B is the one disposed in the recessed portion 41C in the region of the operation input acceptance part 4C on the upper surface of the operation part holding member 34. Since the finger insertion operation part 12 disposed in the recessed portion 41D in the region of the operation input acceptance part 4D has a similar configuration, the description thereof is omitted.

FIG. 6A is a view of the finger insertion operation part 12 as viewed from right above in the direction perpendicular to the upper surface of the operation part holding member 34, with the operation element 12H of the finger insertion operation part 12 removed. FIG. 6B is a view of a longitudinal cross section of the finger insertion operation part 12 (a cross section cut along a plane in the direction perpendicular to the upper surface of the operation part holding member 34) with the operation element 12H attached.

As illustrated in FIGS. 2 and 6A, each of the four position indication coils 12L1 to 12L4 is disposed in a corresponding one of sections defined in the circular recessed portion 41C in the region of the operation input acceptance part 4C of the operation part holding member 34.

Specifically, a circular bottom surface of the recessed portion 41C is divided into four 90-degree angle ranges in a circumferential direction, and the four position indication coils 12L1 to 12L4 are separately arranged in their respective 90-degree angle ranges divided in this way.

These four position indication coils 12L1 to 12L4 are arranged in the finger insertion operation part 12 in such a manner as to be, in response to the operation of the operation element 12H, movable in the longitudinal and lateral directions on the upper surface of the operation part holding member 34 as well as in the height direction, which is the direction perpendicular to the upper surface of the operation part holding member 34.

In this example, as illustrated in FIGS. 6A and 6B, the four position indication coils 12L1 to 12L4 are disposed on a lower surface of a circular flexible substrate 121 which has a smaller diameter than an inner diameter of the circular recessed portion 41C. In this case, the four position indication coils 12L1 to 12L4, each of which is a wire wound one or more times, are deposited on the lower surface of the flexible substrate 121. In this case, as illustrated in FIG. 6A, each of the four position indication coils 12L1 to 12L4 is wound in a sector shape and disposed in a corresponding one of the 90-degree angle ranges on the lower surface of the circular flexible substrate 121.

As illustrated in FIGS. 6A and 6B, the position indication coils 12L1, 12L2, 12L3, and 12L4 are respectively connected to capacitors 12C1, 12C2, 12C3, and 12C4 which are arranged on the lower surface of the flexible substrate 121, thereby constituting resonant circuits. Each of the resonant circuits is coupled to the position detection sensor 32 through electromagnetic coupling, so that each of the position indication coils 12L1 to 12L4 can indicate the position to the position detection sensor 32.

As illustrated in FIG. 6B, an elastic member which is, in this example, a coil spring 122 is disposed between the flexible substrate 121 and a bottom surface 41Ca of the recessed portion 41C of the operation part holding member 34. The coil spring 122 is elastically displaced when the operation element 12H is pressed in the height direction perpendicular to the bottom surface 41Ca, and also serves as a return spring.

In this example, the flexible substrate 121 is held in the recessed portion 41C such that the flexible substrate 121 can move in the longitudinal and lateral directions on the upper surface of the operation part holding member 34, which are the directions parallel to the upper surface of the operation part holding member 34.

Specifically, in this example, the flexible substrate 121 is attached to an elastic holding member 123 which is made of an elastic material such as elastic rubber that is easily elastically stretchable. The elastic holding member 123 includes a coupling portion 123a for coupling to the operation element 12H at a center position of the circular recessed portion 41C. Further, the elastic holding member 123 includes four belt-shaped portions 123b, 123c, 123d, and 123e which extend from the coupling portion 123a in the directions parallel to the bottom surface 41Ca of the recessed portion 41C and perpendicular to each other.

The belt-shaped portions 123b and 123c of the elastic holding member 123 are coupled to each other by an arc-shaped portion 123f. The belt-shaped portions 123c and 123d are coupled to each other by an arc-shaped portion 123g. The belt-shaped portions 123d and 123e are coupled to each other by an arc-shaped portion 123h. The belt-shaped portions 123e and 123b are coupled to each other by an arc-shaped portion 123i. These four arc-shaped portions 123f, 123g, 123h, and 123i are formed along the circumference of a predetermined radius from a center position of the coupling portion 123a. In this example, the radius of these four arc-shaped portions 123f, 123g, 123h, and 123i from the center position of the coupling portion 123a is the same as or slightly smaller than the radius of the circular flexible substrate 121.

In this example, moreover, as illustrated in FIGS. 6A and 6B, the upper surface of the flexible substrate 121 is fixed to the elastic holding member 123 in the state in which the center position of the circular flexible substrate 121 substantially matches the center position of the coupling portion 123a of the elastic holding member 123.

Further, tips of the four belt-shaped portions 123b, 123c, 123d, and 123e of the elastic holding member 123 are fixed to a side wall surface 41Cb (see FIG. 6B) of the circular recessed portion 41C, so that the elastic holding member 123 is attached to the recessed portion 41C.

As illustrated in FIG. 6B, the positions in the height direction at which the tips of the four belt-shaped portions 123b, 123c, 123d, and 123e of the elastic holding member 123 are fixed to the side wall surface 41Cb of the circular recessed portion 41C correspond to the height positions in the state in which the coil spring 122 is interposed between the flexible substrate 121 and the bottom surface 41Ca of the recessed portion 41C and no pressing force is applied to the operation element 12H.

Further, as illustrated in FIG. 6B, the operation element 12H is coupled to the elastic holding member 123 at the coupling portion 123a of the elastic holding member 123.

The finger insertion operation part 12 in the example of FIGS. 6A and 6B is configured as described above. Therefore, when the user moves the operation element 12H in the longitudinal and lateral directions parallel to the upper surface of the operation part holding member 34, the coupling portion 123a of the elastic holding member 123 is elastically displaced to move in the longitudinal and lateral directions parallel to the upper surface of the operation part holding member 34, and the positions of the position indication coils 12L1 to 12L4 can be changed in the displaced direction. Further, when the user presses the operation element 12H, the position in the height direction of the coupling portion 123a of the elastic holding member 123 is elastically displaced, thereby changing the height, that is, the distance between the position indication coils 12L1 to 12L4 and the bottom surface 41Ca of the recessed portion 41C.

Example of Configuration of Cross-Shaped Operation Part 13

Figure 7A:
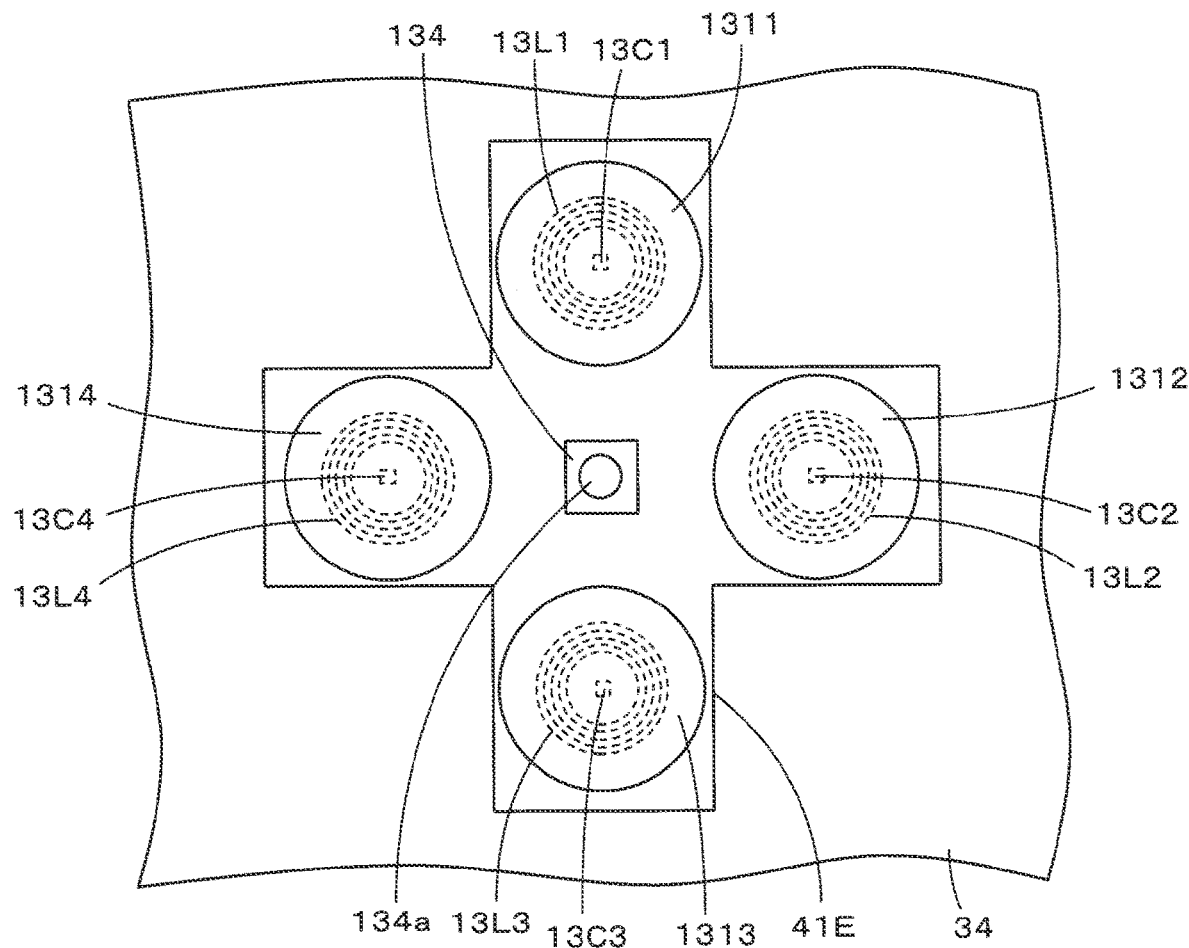
FIGS. 7A and 7B are views for describing another example of the operation part used in the input device according to the first embodiment of the present disclosure.
Figure 7B:
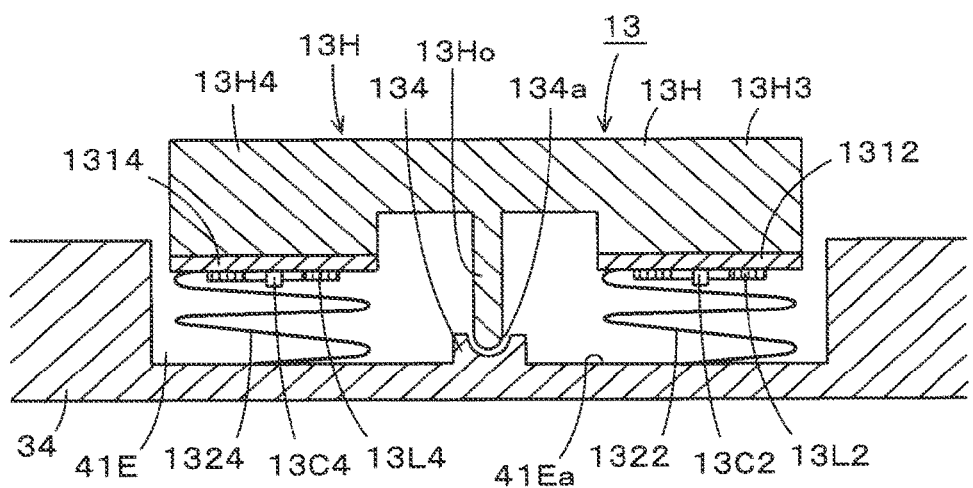

As illustrated in FIGS. 2 and 7A and 7B, the cross-shaped operation part 13 includes four position indication coils 13L1, 13L2, 13L3, and 13L4.

FIGS. 7A and 7B are views for describing an example of a configuration of the cross-shaped operation part 13, which is disposed in the recessed portion 41E of the operation input acceptance part 4E on the upper surface of the operation part holding member 34. Specifically, FIG. 7A is a view of the cross-shaped operation part 13 as viewed from right above in the direction perpendicular to the upper surface of the operation part holding member 34, with the operation element 13H of the cross-shaped operation part 13 removed. FIG. 7B is a view of a longitudinal cross section of the cross-shaped operation part 13 (a cross section cut along a plane in the direction perpendicular to the upper surface of the operation part holding member 34) with the operation element 13H attached.

As illustrated in FIGS. 2 and 7A and 7B, the four position indication coils 13L1 to 13L4 are separately disposed at respective ends of recessed grooves crossing each other in the cross-shaped recessed portion 41E in the region of the operation input acceptance part 4E of the operation part holding member 34.

These four position indication coils 13L1 to 13L4 are disposed in the cross-shaped operation part 13 in such a manner as to be, in response to the operation of the cross-shaped operation element 13H, movable in the height direction, which is the direction perpendicular to the upper surface of the operation part holding member 34.

That is, in this example, as illustrated in FIGS. 7A and 7B, the four position indication coils 13L1, 13L2, 13L3, and 13L4 are respectively disposed on the lower surfaces of circular flexible substrates 1311, 1312, 1313, and 1314 whose diameters are smaller than the width of the recessed grooves of the cross-shaped recessed portion 41E. In this case, the four position indication coils 13L1, 13L2, 13L3, and 13L4, each of which is a wire wound one or more times, are respectively deposited on the lower surfaces of the flexible substrates 1311, 1312, 1313, and 1314.

As illustrated in FIGS. 7A and 7B, the position indication coils 13L1, 13L2, 13L3, and 13L4 are respectively connected to capacitors 13C1, 13C2, 13C3, and 13C4 which are disposed on the lower surfaces of the flexible substrates 1311, 1312, 1313, and 1314. Accordingly, the position indication coils 13L1 to 13L4 and their respective capacitors 13C1 to 13C4 constitute resonant circuits. Each of the resonant circuits is coupled to the position detection sensor 32 through electromagnetic induction, so that each of the position indication coils 13L1 to 13L4 can indicate the position to the position detection sensor 32.

Further, each of elastic members which are, in this example, coil springs 1321, 1322, 1323, and 1324 is disposed between a corresponding one of the flexible substrates 1311 to 1314 and a bottom surface 41Ea of the recessed portion 41E of the operation part holding member 34. Each of these coil springs 1321, 1322, 1323, and 1324 is a return spring that is elastically displaced when a corresponding one of the four ends 13H1, 13H2, 13H3, and 13H4 (see FIGS. 1 and 7B) of the cross-shaped operation element 13H is pressed and that returns the end to its original height position when the pressing force disappears.

In this example, moreover, a support shaft 13Ho for seesaw movement of the cross-shaped operation element 13H is formed at the center position of the cross-shaped operation element 13H, as illustrated in FIG. 7B. As illustrated in FIGS. 7A and 7B, a support shaft receiving portion 134 which supports and receives a tip of the support shaft 13Ho of the cross-shaped operation element 13H is disposed at the center position of the bottom surface 41Ea of the recessed portion 41E of the operation input acceptance part 4E for the cross-shaped operation part 13 where the recessed grooves cross.

The cross-shaped operation part 13 in the example of FIGS. 7A and 7B is configured as described above. With this configuration, when the user presses one of the four ends 13H1, 13H2, 13H3, and 13H4 of the operation element 13H, the distance between a corresponding one of the four position indication coils 13L1, 13L2, 13L3, and 13L4 and the bottom surface 41Ea of the recessed portion 41E, that is, the height position, can be changed.

Example of Electronic Circuit Configuration of Input Device 1

FIG. 8 is a diagram illustrating an example of an electronic circuit configuration of the input device 1 according to the present embodiment. The circuit board 31 includes the position detection circuit 100, the operation information processing circuit 200, and the wireless communication device 300. As illustrated in FIG. 8, the position detection sensor 32 is connected to the position detection circuit 100. Further, the output of the position detection circuit 100 is supplied to the operation information processing circuit 200, and the output (control signal) of the operation information processing circuit 200 is transmitted to a game machine main body or a personal computer through the wireless communication device 300. In this example, the wireless communication device 300 performs wireless communication according to a Bluetooth (registered trademark) standard communication method.

As illustrated in FIG. 8, in this example, the position detection sensor 32 includes an X-axis direction loop coil group 321X and a Y-axis direction loop coil group 321Y which are stacked on the flexible substrate, for example. Each of the loop coils $X_1$ to $X_n$ of the X-axis direction loop coil group 321X and each of the loop coils $Y_1$ to $Y_m$ of the Y-axis direction loop coil group 321Y may have one turn or two or more turns. Further, the number n of loop coils of the X-axis direction loop coil group 321X and the number m of loop coils of the Y-axis direction loop coil group 321Y can also be set appropriately according to the size of the position detection sensor 32.

The position detection circuit 100 includes an oscillator 101, a current driver 102, a selection circuit 103, a switching connection circuit 104, a reception amplifier 105, and a position detection processing circuit 106. The loop coils of the loop coil groups 321X and 321Y of the position detection sensor 32 are connected to the selection circuit 103.

The position detection processing circuit 106 detects the coordinate positions of the position indication coil 11L of each push button operation part 11, the position indication coils 12L1 to 12L4 of each finger insertion operation part 12, and the position indication coils 13L1 to 13L4 of the cross-shaped operation part 13 on the position detection sensor 32. As in the example of FIGS. 5A and 5B, when the operation part includes the pressure detector, the position detection processing circuit 106 also performs a pressure detection process.

Further, the position detection processing circuit 106 has functions of controlling selection of a loop coil of the position detection sensor 32 in the selection circuit 103, switching performed by the switching connection circuit 104, and processing timings of position detection and pressure detection.

The X-axis direction loop coil group 321X and the Y-axis direction loop coil group 321Y of the position detection sensor 32 are connected to the selection circuit 103. The selection circuit 103 sequentially selects one loop coil among the two loop coil groups 321X and 321Y. The oscillator 101 generates an alternating current (AC) signal. Each AC signal has a frequency corresponding to a resonant frequency of a resonant circuit including a corresponding one of the position indication coils 11L, 12L1 to 12L4, and 13L1 to 13L4. The oscillator 101 supplies the generated AC signal to the current driver 102. The current driver 102 converts the AC signal supplied from the oscillator 101 into current and outputs the current to the switching connection circuit 104.

Under the control of the position detection processing circuit 106, the switching connection circuit 104 changes a connection destination (a transmission-side terminal T, a reception-side terminal R) to which the loop coil selected by the selection circuit 103 is connected.

When the switching connection circuit 104 switches the connection destination to the transmission-side terminal T, the current from the current driver 102 is supplied to the loop coil selected by the selection circuit 103. As a result, a magnetic field is generated in the loop coil, and a signal (radio wave) is transmitted to act on the resonant circuit of a corresponding one of the operation parts 11 to 13 disposed to face the position detection sensor 32. Since the resonant frequencies of the resonant circuits including the position indication coils 11L, 12L1 to 12L4, and 13L1 to 13L4 are different from each other, AC signals with different frequencies are sequentially generated from the oscillator 101.

As an example, a resonant circuit RC1 which includes a position indication coil 11L1 and the capacitor 11C of the push button operation part 11 among the operation parts 11 to 13 is illustrated in the upper left part of FIG. 8. In the case of the push button operation part 11', as illustrated in the rightmost side of the upper left part of FIG. 8, the position indication coil 11L1, the capacitor 11C, and a variable capacitor 113C, which is constituted by the pressure detector 113, of the push button operation part 11' constitute a resonant circuit RC1'.

When each of the resonant circuits of the operation parts 11 to 13 receives the AC signal of the corresponding frequency from the position detection sensor 32 through electromagnetic induction coupling, the resonant circuit returns the received signal to the position detection sensor 32 at the time when the position detection sensor 32 is in the receiving state.

After the position detection processing circuit 106 connects the switching connection circuit 104 to the transmission-side terminal T and transmits an AC signal of a frequency f0 to the resonant circuits of the operation parts 11 to 13 through electromagnetic induction coupling, the position detection processing circuit 106 causes the switching connection circuit 104 to switch the connection destination to the reception-side terminal R.

The induction voltage generated in the loop coil of the position detection sensor 32 by the feedback signal from any of the resonant circuits of the operation parts 11 to 13 is transmitted to the reception amplifier 105 via the selection circuit 103 and the switching connection circuit 104. The reception amplifier 105 amplifies the induction voltage supplied from the loop coil and transmits it to the position detection processing circuit 106 as a received signal.

The position detection processing circuit 106 detects which loop coil is selected when the signal received from the reception amplifier 105 is obtained, thereby detecting the coordinate position of the corresponding one of the position indication coils 11L, 12L1 to 12L4, and 13L1 to 13L4 of the resonant circuits of the operation parts 11 to 13 on the position detection sensor 32 that has transmitted the received signal. Then, the position detection processing circuit 106 detects the signal level of the signal received from the reception amplifier 105. The signal levels of the received signals exhibit levels corresponding to the height positions of the position indication coils 11L, 12L1 to 12L4, and 13L1 to 13L4 of the operation parts 11 to 13.

When the resonant circuits of the operation parts 11 to 13 include variable capacitors including pressure detectors, the position detection processing circuit 106 synchronously detects a received signal with a signal transmitted from the oscillator 101 and detects the frequency shift (phase difference) therebetween, thereby detecting the pressure applied to the corresponding operation part.

The position detection processing circuit 106 supplies information regarding the detected coordinate positions of the position indication coils 11L, 12L1 to 12L4, and 13L1 to 13L4, their received signal levels, and information regarding the detected pressure to the operation information processing circuit 200.

As illustrated in FIG. 8, the operation information processing circuit 200 includes an operation detection circuit 210 and a control signal output circuit 220. This operation information processing circuit 200 can be configured by an integrated circuit (IC) as a microprocessor unit.

The operation detection circuit 210 of the operation information processing circuit 200 includes a region storage device 211, a region determination circuit 212, per-region operation detection circuits 213, 214, 215, 216, and 217, and a switch determination circuit 218. Each unit of the operation detection circuit 210 can be configured as a software functional unit that is executed by execution of a program. Needless to say, the region storage device 211 may also be an external part attached to the microprocessor unit.

As described above, in the input device 1 according to the present embodiment, the position detection sensor 32 is disposed to overlap with the operation part holding member 34. Therefore, five detection regions DA, DB, DC, DD, and DE corresponding to the regions of the five operation input acceptance parts 4A, 4B, 4C, 4D, and 4E of the operation part holding member 34 can be set in the position detection region of the position detection sensor 32 as separately indicated by the dotted lines in FIG. 3.

As illustrated in FIG. 9, in this example, the region storage device 211 stores correspondence table information including information regarding the region ranges of the five detection regions DA, DB, DC, DD, and DE, which are set in the position detection region of the position detection sensor 32, information regarding the detection target operation parts, and information regarding detection application software (abbreviated as detection apps) for detecting the operation mode that needs to be detected for each operation part.

As information regarding the region ranges, since the five detection regions DA, DB, DC, DD, and DE are all rectangular regions in this example, each region range is identified by the coordinates of an upper left corner and the coordinates of a lower right corner of each rectangular region in the position detection region of the position detection sensor 32 as illustrated in FIG. 9. As illustrated in FIG. 3, when an X-axis direction of the position detection region of the position detection sensor 32 corresponds to the lateral direction of the operation part holding member 34 and a Y-axis direction of the position detection region of the position detection sensor 32 corresponds to the longitudinal direction of the operation part holding member 34, the coordinates of an upper left corner of the detection region DA are (xa, ya), and the coordinates of a lower right corner of the detection region DA are (xb, yb), for example.

As the detection target operation parts, the four push button operation parts 11 of the operation input acceptance part 4A are stored in association with the detection region DA, the two push button operation parts 11 of the operation input acceptance part 4B are stored in association with the detection region DB, the finger insertion operation part 12 (left thumb) of the operation input acceptance part 4C is stored in association with the detection region DC, the finger insertion operation part 12 (right thumb) of the operation input acceptance part 4D is stored in association with the detection region DD, and the cross-shaped operation part 13 of the operation input acceptance part 4E is stored in association with the detection region DE.

The information regarding the detection apps stored in the region storage device 211 includes information APR1, APR2, APR3, APR4, and APR5 for activating detection apps for detecting the above-described operation modes accepted by the operation input acceptance parts 4A, 4B, 4C, 4D, and 4E, which respectively correspond to the detection regions DA, DB, DC, DD, and DE.

In this example, the detection apps for detecting the above-described operation modes accepted by the operation input acceptance parts 4A, 4B, 4C, 4D, and 4E are respectively configured as the per-region operation detection circuits 213, 214, 215, 216, and 217.

The storage information in the region storage device 211 may be stored in advance. Alternatively, a user who has purchased the input device 1 may access a specified website and download the storage information from the website at the beginning of use of the input device 1. Each of the detection apps configured as the per-region operation detection circuits 213, 214, 215, 216, and 217 may similarly be downloaded.

In this case, access to the website and downloading from the website are performed via a game machine main body or a personal computer to which the input device 1 is wirelessly connected through the wireless communication device 300.

The region determination circuit 212 of the operation information processing circuit 200 receives coordinate information and height position information of each of the position indication coils of the operation parts 11 to 13 from the position detection processing circuit 106. The region determination circuit 212 refers to the information regarding the region ranges in the region storage device 211. Then, based on the coordinates of the received coordinates of the position indication coil, the region determination circuit 212 determines which of the position indication coils of the operation parts in the detection regions DA, DB, DC, DD, and DE is the position indication coil having the received coordinate information.

When the region determination circuit 212 determines that the position indication coil whose coordinate information is received from the position detection processing circuit 106 is any of the position indication coils of the operation parts within the detection region DA, the region determination circuit 212 activates, based on the storage information stored in the region storage device 211, the per-region operation detection circuit 213, which includes a detection app for the region DA, and supplies, to the per-region operation detection circuit 213, the coordinate information and height position information of the position indication coil received from the position detection processing circuit 106.

Similarly, when the region determination circuit 212 determines that the position indication coil whose coordinate information is received from the position detection processing circuit 106 is the position indication coil of the operation part in any of the detection regions DB, DC, DD, and DE, the region determination circuit 212 activates, based on the storage information stored in the region storage device 211, a corresponding one of the per-region operation detection circuit 214, which includes a detection app for the determined detection region DB, the per-region operation detection circuit 215, which includes a detection app for the determined detection region DC, the per-region operation detection circuit 216, which includes a detection app for the determined detection region DD, and the per-region operation detection circuit 217, which includes a detection app for the determined detection region DE, and supplies, to the corresponding one of the per-region operation detection circuits 214 to 217, the coordinate information and height position information of the position indication coil received from the position detection processing circuit 106.

The per-region operation detection circuit 213 for the detection region DA first detects the coordinate position of the position indication coil 11L of each of the four push button operation parts 11 of the operation input acceptance part 4A and detects the height position of each position indication coil 11L from the magnitude of the signal level of the signal received from each position indication coil 11L.

Then, the per-region operation detection circuit 213 performs a process of detecting various operation modes described above that are allocated to the four push button operation parts 11 of the operation input acceptance part 4A from the detection output of the height position of the position indication coil 11L of each of the four push button operation parts 11. Then, the per-region operation detection circuit 213 supplies the information regarding the detected operation mode to the control signal output circuit 220. This similarly applies to the detection regions DB, DC, DD, and DE, and each of the per-region operation detection circuits 214, 215, 216, and 217 performs an operation corresponding to each detection region.

Further, as illustrated in FIG. 8, in the present embodiment, the push button switch Psw is connected to the operation information processing circuit 200, and the operation information processing circuit 200 includes the switch determination circuit 218. The switch determination circuit 218 monitors a push button switch operation of the push button switch Psw and determines the switch state of the push button switch Psw. Then, the switch determination circuit 218 supplies the information regarding the switch state of the push button switch Psw to the control signal output circuit 220.

The control signal output circuit 220 receives the information regarding an operation mode detected by each of the per-region operation detection circuits 213 to 217 and the information regarding the switch state of the push button switch Psw and generates a control signal to be transmitted to a game machine or a personal computer. The control signal output circuit 220 then transmits the generated control signal to the game machine or the personal computer through the wireless communication device 300.

As described above, the operation part holding member 34 is disposed above the position detection sensor 32 of the electromagnetic induction type, and the operation parts 11 to 13, which include the position indication coils, are held on the operation part holding member 34. The input device 1 according to the embodiment described above can be implemented with this simple configuration.

In the input device 1 according to the embodiment described above, the region of the upper surface of the operation part holding member 34 and the detection region of the position detection sensor 32 are divided into a plurality of regions that do not overlap with each other, and the operation input acceptance parts 4A to 4E, which can accept different operation modes, are allocated to the respective divided regions. With this simple configuration, the input device 1 can easily generate control signals corresponding to a plurality of types of operation modes.

Further, the input device 1 according to the embodiment described above also includes the operation detection apps, each of which is provided for a corresponding one of the operation input acceptance parts allocated to their respective divided regions. Therefore, by changing the operation detection apps, it is possible to easily cope with the change of the allocation of the operation input acceptance parts to the divided regions.

Further, in the input device 1 according to the embodiment described above, each of the operation detection apps corresponding to the operation input acceptance parts allocated to the respective divided regions only needs to process, as the target information, the coordinate information and the information regarding the reception level of the received signal that are detected in the allocated detection region of the position detection sensor 32. Therefore, compared to the case where the entire position detection region of the position detection sensor 32 is a processing target, the operation detection process can be performed quickly and accurately.

Therefore, the design of the input device 1 can easily be changed by changing the division of the multiple regions of the operation part holding member 34, the allocation of the operation input acceptance parts to the divided regions, and the allocation of the detection apps corresponding to the allocated operation input acceptance parts. In this case, the position detection sensor 32 does not need to be changed structurally, and it suffices that the detection regions of the position detection region of the position detection sensor 32 are divided according to the regions of the operation input acceptance parts of the operation part holding member 34. That is, in terms of the structure, the design of the input device 1 can easily be changed just by changing only the operation part holding member 34 according to the operation input acceptance parts to be allocated.

A conventional input device of this type requires each of a plurality of operation parts to be arranged at a fixed position in consideration of operability, making a change of the arrangement positions of the operation parts in a casing difficult. Therefore, the types of the plurality of operation parts arranged in the conventional input device are inevitably fixed. However, the input device according to the embodiment described above can solve the conventional problems.

Second Embodiment

As described above, in terms of the structure, the design of the input device according to the embodiment of the present disclosure can be changed easily just by changing only the operation part holding member 34 according to the operation input acceptance parts to be allocated. A second embodiment of the present disclosure is an example of the input device that effectively uses this advantage.

Figure 10:
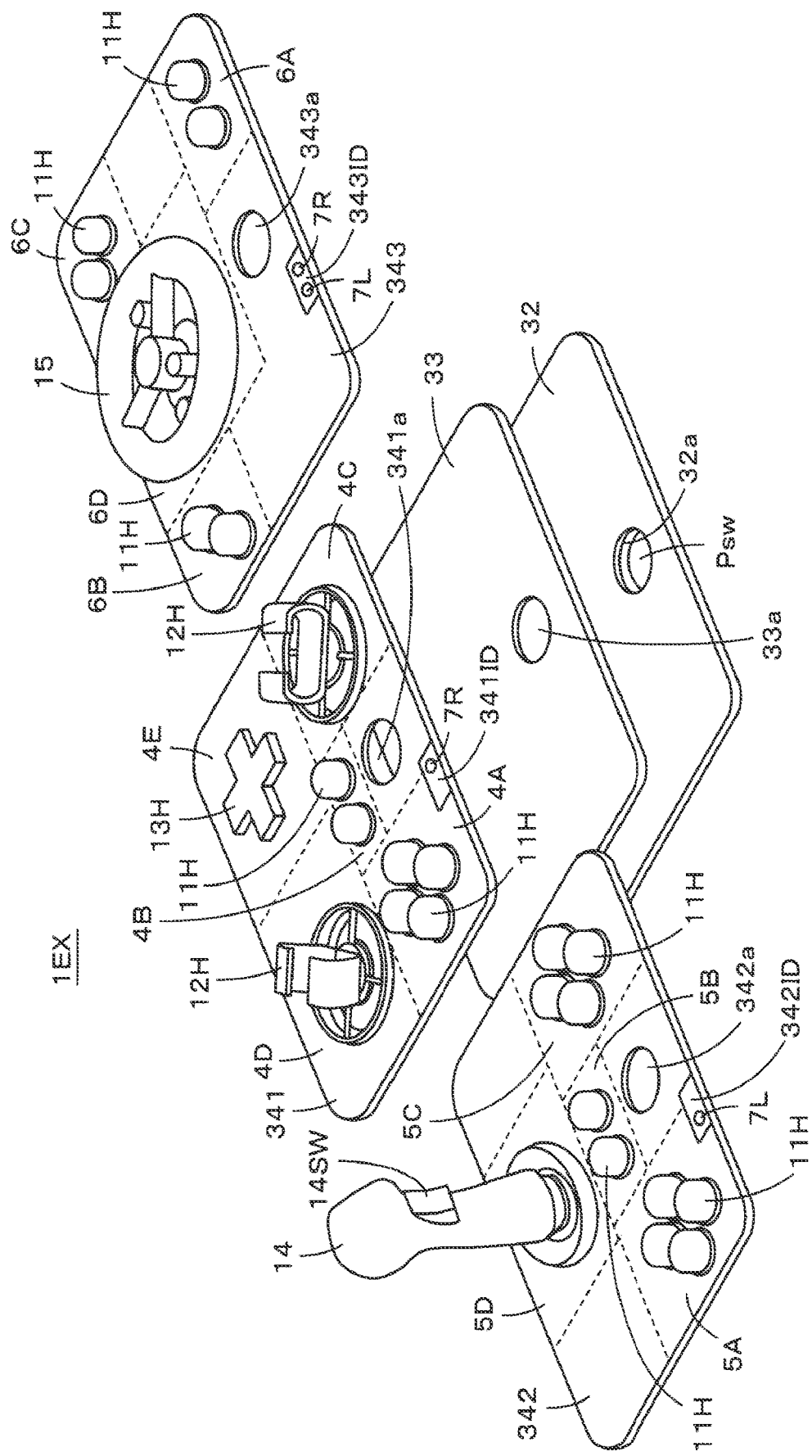
FIG. 10 is a view for describing an overview of an input device according to a second embodiment of the present disclosure.

In the second embodiment, the operation part holding member 34 of the input device 1 according to the above-described first embodiment is configured to be replaceable. FIG. 10 is an exploded perspective view for describing an overview of an example of a configuration of an input device 1EX according to the second embodiment. It is noted that the illustration of the frame case 2 and the circuit board 31 of the input device 1 according to the first embodiment is omitted in FIG. 10. In FIG. 10, the same components as those of the input device 1 according to the above-described first embodiment are denoted with the same reference signs, and the detailed description thereof is omitted.

As illustrated in FIG. 10, the input device 1EX according to the second embodiment includes the position detection sensor 32 whose upper surface is attached to the protective cover 33, as with the input device 1 according to the first embodiment described above.

In the input device 1EX according to the second embodiment, as illustrated in FIG. 10, three types of operation part holding members 341, 342, and 343 of the same size are prepared as the operation part holding members to be disposed on the position detection sensor 32 with the protective cover 33 interposed therebetween. In the input device 1EX according to the second embodiment, any one of the three operation part holding members 341, 342, and 343 is attached to the position detection sensor 32 with the protective cover 33 interposed therebetween by, for example, bonding with a bonding member such as double-sided tape. In this case, the bonding member such as double-sided tape is made of a material that allows the operation part holding members 341, 342, and 343 to be easily attached to and detached from the protective cover 33.

The three prepared operation part holding members 341, 342, and 343 of the input device 1EX according to the second embodiment have configurations that allow operations in different operation modes. Specifically, in this example, as illustrated in FIG. 10, each of the three operation part holding members 341, 342, and 343 is configured to hold a plurality of operation parts. As indicated by dotted lines in FIG. 10, the region division varies among the three operation part holding members 341, 342, and 343, and a predetermined operation part is arranged in each region.

Further, identification information regions 341ID, 342ID, and 343ID are respectively provided as small region ranges at the same positions on the upper surfaces of the operation part holding members 341, 342, and 343 according to this example and each transmit identification information for identifying a corresponding one of the operation part holding members 341, 342, and 343 to the position detection sensor 32. In this example, a position indication coil can be disposed at the two left and right positions in each of the identification information regions 341ID, 342ID, and 343ID, as illustrated in FIG. 10, so that identification information of each of the operation part holding members 341, 342, and 343 can be recognized as binary information according to the position of the position indication coil.

In this example, the operation part holding member 342 includes a control stick operation part 14 which is useful for, for example, a flight simulator. An example of a configuration of the operation part holding member 342 is further described with reference to FIGS. 11A to 11D.

As illustrated in FIGS. 10 and 11A to 11D, a plurality of push button operation parts 11 are disposed in each of operation input acceptance parts 5A, 5B, and 5C of the operation part holding member 342 according to this example, and the control stick operation part 14 is disposed in an operation input acceptance part 5D of the operation part holding member 342. The control stick operation part 14 includes an operation element 14H and an operation element holder 14BS which attaches and holds the operation element 14H onto the operation part holding member 342.

The operation element holder 14BS is held and fixed in the region of the operation input acceptance part 5D of the operation part holding member 342. The operation element 14H can be tilted forward, backward, leftward, and rightward with respect to the operation element holder 14BS, as indicated by arrows in FIGS. 11A and 11B, and is held by and coupled to the operation element holder 14BS such that a tip of the operation element 14H is rotatable.

Figure 11A:
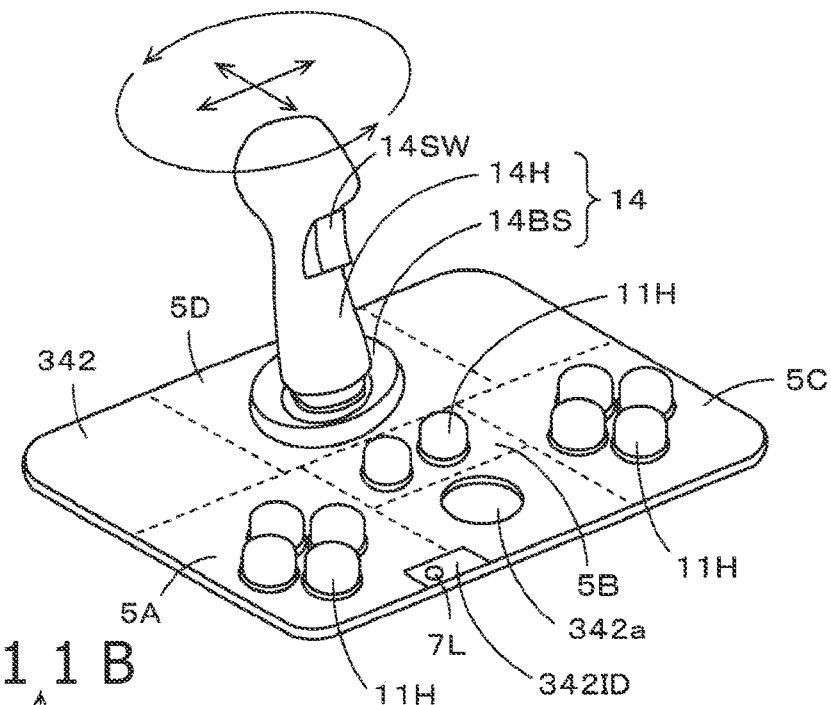
FIGS. 11A to 11D are views for describing an example of an operation part used in the input device according to the second embodiment of the present disclosure.
Figure 11B:
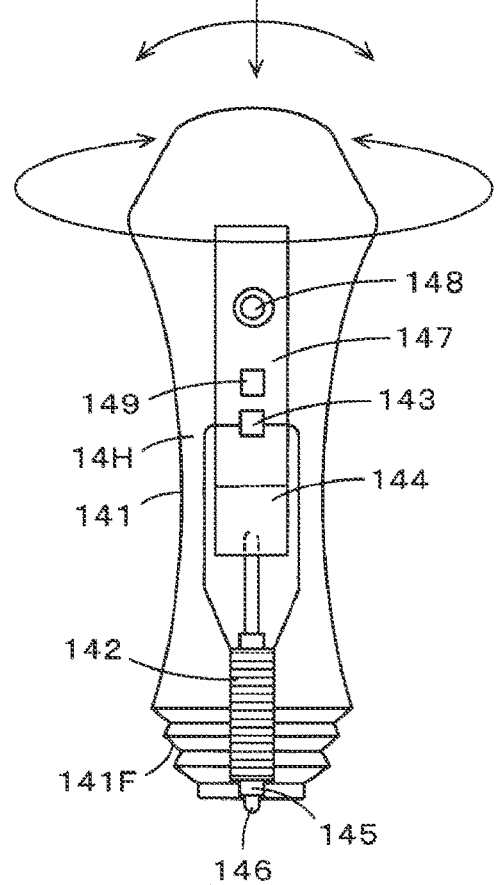

As illustrated in FIG. 11B, the operation element 14H of the control stick operation part 14 includes a position indication coil 142, a capacitor 143, and a pressure detector 144 which are housed in a casing 141 in the shape of a cylindrical member deformed into a grip shape that can be gripped by a user's hand. The capacitor 143 constitutes a resonant circuit together with the position indication coil 142.

As illustrated in FIG. 11B, in this example, the position indication coil 142 is wound around a magnetic core, in this example, a ferrite core 145, and is disposed at an end of the casing 141 on a side where the casing 141 is coupled to the operation element holder 14BS. In this example, in an axial direction of the casing 141, the pressure detector 144 is disposed on an opposite side of the ferrite core 145 around which the position indication coil 142 is wound, that is, on the side opposite to the side where the casing 141 is coupled to the operation element holder 14BS. As with the pressure detector 113 illustrated in the example of the push button operation part 11 in FIGS. 5A and 5B, the pressure detector 144 is configured to detect a pressure as a change in the capacitance of a variable capacitor.

In this example, although illustration is omitted, the ferrite core 145 has a through hole in its axial direction, and the casing 141 also has an opening which is formed on the side where the casing 141 is coupled to the operation element holder 14BS and which communicates with the through hole of the ferrite core 145 in the axial direction.

As illustrated in FIG. 11B, an elongated rod-shaped core body 146 which is, for example, made of a hard resin is inserted into the casing 141 through the opening of the casing 141 and the through hole of the ferrite core 145, and an end of the core body 146 is fitted to a fitting portion of the pressure detector 144.

Therefore, when the operation element 14H is pressed, the core body 146 comes into contact with a bottom surface of a holding recessed portion for the control stick operation part 14 in the operation input acceptance part 5D of the operation part holding member 342, and a pressure corresponding to the pressing force of the user is applied to the core body 146. Then, the pressure detector 144 detects the pressure as a change in the capacitance.

A circuit board 147 is disposed in the casing 141. The capacitor 143 is disposed on the circuit board 147 and connected between one end and the other end of the position indication coil 142, thereby constituting a resonant circuit.

Figure 11C:
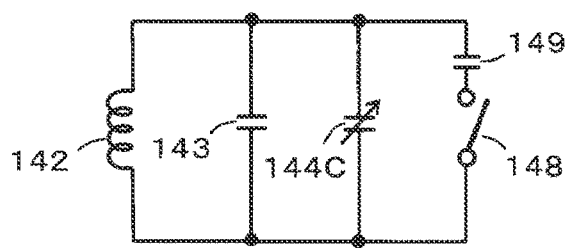

A resonant circuit 14RC illustrated in FIG. 11C is formed on the circuit board 147. That is, the capacitor 143 is connected in parallel to the position indication coil 142, and a variable capacitor 144C which is constituted by the pressure detector 144 is connected in parallel thereto. Moreover, a series circuit of a switch 148 and a capacitor 149 is connected to the position indication coil 142. As illustrated in FIG. 11A, a button 14SW for turning the switch 148 on and off is disposed on the operation element 14H.

Therefore, the resonant frequency of the resonant circuit 14RC is shifted (phase shifted) according to the capacitance of the variable capacitor 144C, which is constituted by the pressure detector 144, and changes in response to ON/OFF of the switch 148. The position detection circuit 100 detects the frequency shift (phase shift) and change of the received signal corresponding to the shift of the resonant frequency of the resonant circuit 14RC, thereby detecting the pressure detected by the pressure detector 144 and the ON/OFF state of the switch 148. The pressure detected by the pressure detector 144 is used to detect the pressing operation and pressing force of the operation element 14H of the control stick operation part 14.

As illustrated in FIG. 11B, an elastically deforming portion 141F which is, in this example, formed in a bellows shape is disposed on the side where the casing 141 of the operation element 14H of the control stick operation part 14 is coupled to the operation element holder 14BS. With this elastically deforming portion 141F, the operation element 14H can be tilted forward, backward, leftward, and rightward with the operation element holder 14BS serving as a fulcrum, and a distal end of the operation element 14H can be rotated according to the operation made by the user.

Figure 11D:
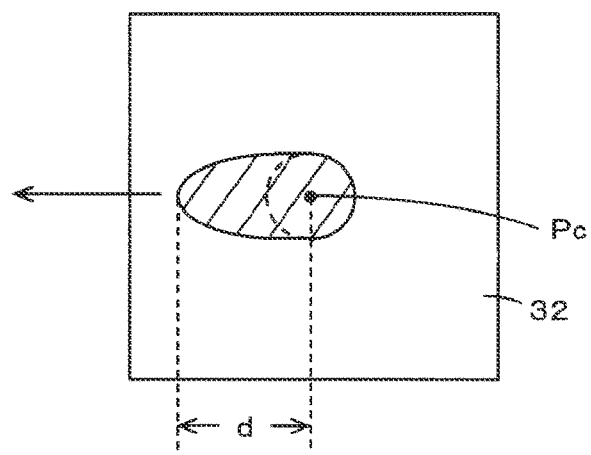

FIG. 11D is a diagram for describing a method for detecting the tilt angle and tilt direction of the operation element 14H of the control stick operation part 14.

When the axial direction of the operation element 14H is tilted with respect to the upper surface of the operation part holding member 342, the position detection sensor 32 receives a signal fed back from the position indication coil 142, in a range of an ellipse illustrated in FIG. 11D. A long-axis direction of the ellipse corresponds to the tilt direction (an arrow direction of FIG. 11D), and a distance d from a position Pc in the long-axis direction corresponds to the tilt angle. Therefore, the position detection circuit 100, which is connected to the position detection sensor 32, can detect the tilt angle and tilt direction of the axial direction of the operation element 14H with respect to the upper surface of the operation part holding member 342.

Therefore, the operation input acceptance part 5D of the operation part holding member 342 can accept the operation mode of the tilt and rotation of the operation element 14H of the control stick operation part 14, and the operation information processing circuit 200 can detect the accepted operation mode. Accordingly, the operation information processing circuit 200 can generate a control signal corresponding to the operation of the operation element 14H of the control stick operation part 14.

Next, in this example, the operation part holding member 343 includes a steering wheel operation part 15 which is useful for, for example, a driving simulator. An example of a configuration of the operation part holding member 343 is further described with reference to FIGS. 12A to 12C.

As illustrated in FIGS. 10 and 12A to 12C, a plurality of push button operation parts are arranged in each of operation input acceptance parts 6A, 6B, and 6C of the operation part holding member 343 according to this example, and the steering wheel operation part 15 is arranged in an operation input acceptance part 6D of the operation part holding member 343 according to this example. The steering wheel operation part 15 includes an operation element 15H which has a shape of a steering wheel and an operation element holder 15BS which attaches and holds the operation element 15H onto the operation part holding member 343.

The operation element holder 15BS is held and fixed in the region of the operation input acceptance part 6D of the operation part holding member 343. The operation element 15H is coupled to and held by the operation element holder 15BS such that the operation element 15H can rotate as indicated by arrows in FIG. 12B.

Figure 12A:
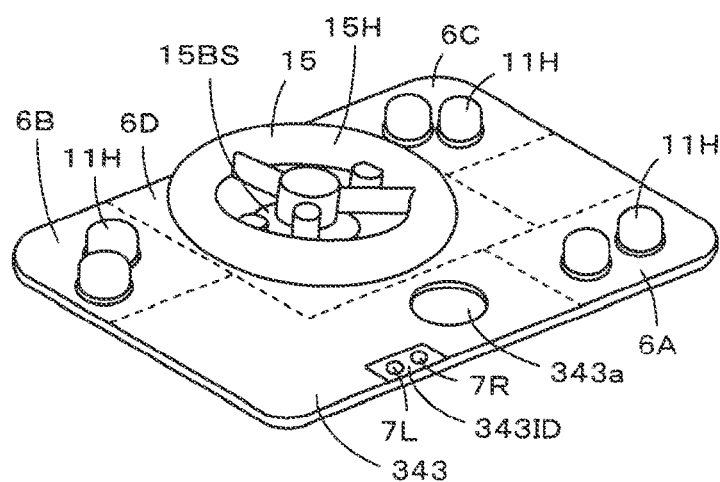
FIGS. 12A to 12C are views for describing another example of the operation part used in the input device according to the second embodiment of the present disclosure.
Figure 12B:
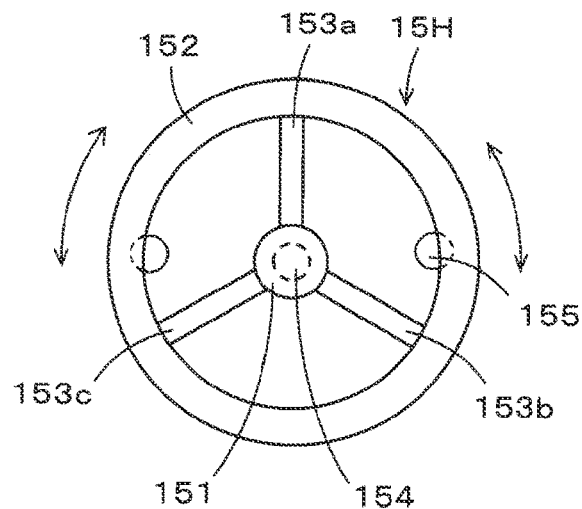

As illustrated in FIGS. 12A and 12B, the operation element 15H of the steering wheel operation part 15 includes a rotation shaft portion 151, a ring-shaped wheel portion 152, and a plurality of, in this example, three arm portions 153a, 153b, and 153c. The rotation shaft portion 151 has a cylindrical shape and is rotatably coupled to the operation element holder 15BS. The wheel portion 152 is gripped and rotated by the user. The three arm portions 153a, 153b, and 153c couple the wheel portion 152 to the rotation shaft portion 151.

In the present embodiment, the operation element 15H includes position indication coils for detecting the angle of rotation about the rotation shaft portion 151 of the wheel portion 152 serving as a rotation center position. In this example, a position indication coil 154 is disposed in the rotation shaft portion 151 of the operation element 15H, and a position indication coil 155 is disposed at a predetermined position of the wheel portion 152 in a circumferential direction. These position indication coils 154 and 155 are arranged such that they can sufficiently interact with the position detection sensor 32 through electromagnetic induction and the position detection circuit 100 can easily detect their indicated positions.

A method for detecting the angle of rotation of the wheel portion 152 of the operation element 15H of the steering wheel operation part 15 is described with reference to FIG. 12C. That is, the position detection circuit 100 detects a position P0 of the position indication coil 154 and a position P1 of the position indication coil 155 in the position detection region of the position detection sensor 32.

Here, since the position P0 of the position indication coil 154 is at a predetermined fixed position within the region of the operation input acceptance part 6D, the fixed position P0 is checked. In FIG. 12C, the position coordinates of the position P0 are (x0, y0).

Further, when the operation element 15H is at a home position, the position P1 of the position indication coil 155 is at a predetermined position within the region of the operation input acceptance part 6D. For example, in the example of FIGS. 12A to 12C, the position indication coil 154 and the position indication coil 155 are positioned side by side in the lateral direction of the operation part holding member 343 at the home position. Therefore, as illustrated in FIG. 12C, the position P1 of the position indication coil 155 when the operation element 15H is at the home position is (xi, y0). Here, xi is a position away from x0 by a radius of the wheel portion 152.

Figure 12C:
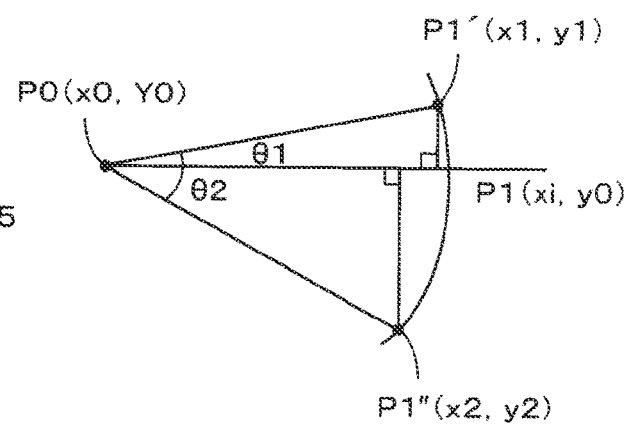

A rotation angle θ1 is an angle of rotation when the wheel portion 152 of the operation element 15H is operated and rotated from the home position and the position indication coil 155 moves from the position P1 to a position P1' as illustrated in FIG. 12C. The rotation angle θ1 is calculated from the position coordinates of both of the positions P1 and P1' by computation. A rotation angle θ2 is a rotation angle when the position indication coil 155 moves from the position P1 to a position P1". As with the rotation angle θ1, the rotation angle θ2 is calculated from the position coordinates of both of the positions P1 and P1" by computation.

Therefore, the operation input acceptance part 6D of the operation part holding member 343 can accept the operation mode of the rotation of the operation element 15H of the steering wheel operation part 15, and the operation information processing circuit 200 can detect the accepted operation mode. Accordingly, the operation information processing circuit 200 can generate a control signal corresponding to the rotation operation of the operation element 15H of the steering wheel operation part 15.

As with the electronic circuit of the input device 1 illustrated in FIG. 8 according to the first embodiment described above, in the input device 1EX according to the second embodiment, an electronic circuit including the position detection circuit 100, the operation information processing circuit 200, and the wireless communication device 300 is disposed on the circuit board 31.

In the input device 1EX according to the second embodiment, the storage contents of the region storage device 211 of the operation information processing circuit 200 are rewritten according to which of the operation part holding members 341, 342, and 343 is mounted on the position detection sensor 32 with the protective cover 33 interposed therebetween, and the detection apps of the per-region operation detection circuits 213, 214, 215, 216, and 217 are changed accordingly.

Figure 13:
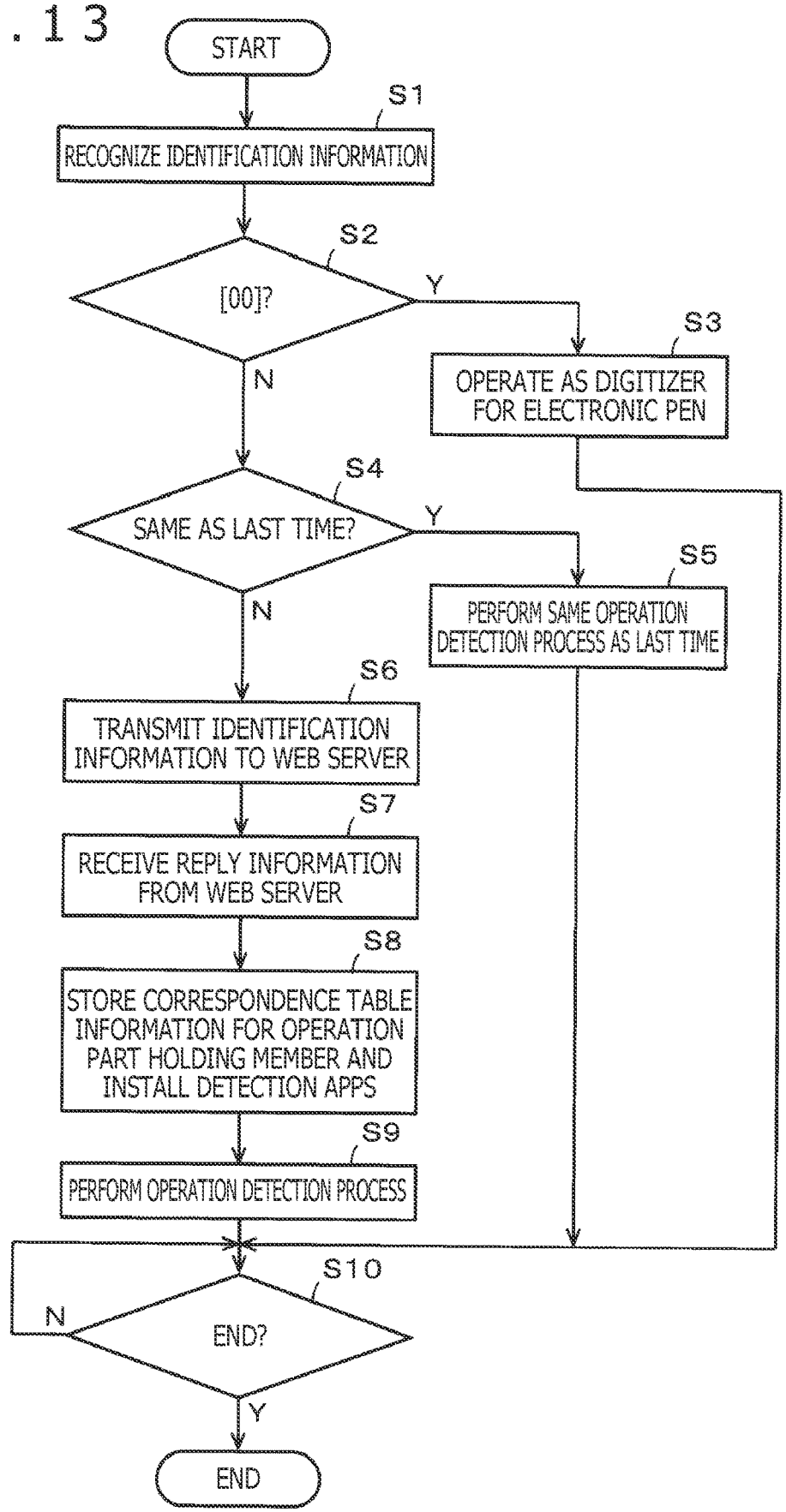
FIG. 13 is a flowchart for describing an example of a flow of a processing operation of the input device according to the second embodiment of the present disclosure.

An operation of the input device 1EX according to the second embodiment is described with reference to a flowchart of FIG. 13. The flowchart of FIG. 13 starts from "START" when the input device 1EX is turned on, for example. The flowchart of FIG. 13 indicates a flow of processing operations in the operation information processing circuit 200, which includes a microprocessor of the input device 1EX.

When the input device 1EX is turned on, the operation information processing circuit 200 recognizes the identification information of the operation part holding member from the detection information of a position indication coil 7L and/or a position indication coil 7R in any of the identification information regions 341ID, 342ID, and 343ID of the operation part holding members 341, 342, and 343 transmitted from the position detection circuit 100 (S1).

Next, the operation information processing circuit 200 determines whether or not the identification information is [00] as a result of recognition at S1 (S2). When the operation information processing circuit 200 determines at S2 that the identification information is [00] and that none of the operation part holding members 341, 342, and 343 is mounted on the position detection sensor 32, the operation information processing circuit 200 operates to function as a digitizer for an electronic pen (S3).

When the operation information processing circuit 200 determines at S2 that the identification information is not [00], the operation information processing circuit 200 determines whether or not the identification information recognized at S1 is the same as the one before power-on (S4). When the operation information processing circuit 200 determines at S4 that the identification information recognized at S1 is the same as the one before power-on, the operation part holding member mounted on the position detection sensor 32 is the same as last time, and the correspondence table information stored in the region storage device 211 is the correspondence table information for the operation part holding member currently mounted. Therefore, the operation information processing circuit 200 performs an operation detection process by using the correspondence table information stored in the region storage device 211 (S5).

When the operation information processing circuit 200 determines at S4 that the identification information recognized at S1 is not the same as the one before power-on, the operation information processing circuit 200 transmits the identification information recognized at S1 to a web server through the wireless communication device 300 and a game machine main body or a personal computer to transmit a request for acquiring the correspondence table information and the detection apps (S6). Then, the operation information processing circuit 200 waits for and receives reply information from the web server that is received through the wireless communication device 300 (S7).

When the operation information processing circuit 200 receives the reply information from the web server at S7, the operation information processing circuit 200 stores, in the region storage device 211, the correspondence table information included in the reply information and installs the detection apps as the per-region operation detection circuits 213 to 217 (S8). As a result, the correspondence table information for the newly mounted operation part holding member is stored in the region storage device 211, and the detection apps for a plurality of operation input acceptance parts of the newly mounted operation part holding member are installed as the per-region operation detection circuits 213 to 217.

After the processing at S8, the operation information processing circuit 200 performs the operation detection process to generate control signals corresponding to the operation modes accepted by the individual operation input acceptance parts of the newly mounted operation part holding member, by using the correspondence table information newly stored in the region storage device 211 as well as the newly installed detection apps (S9).

After S3, S5, or S9, the operation information processing circuit 200 determines whether or not the power is turned off and the operation ends (S10). When the operation does not end, the operation information processing circuit 200 continues the processing at S3, S5, or S9. When the operation information processing circuit 200 determines at S10 that the operation ends, the operation information processing circuit 200 ends this processing routine.

As described above, in the input device 1EX according to the second embodiment, the operation part holding member mounted on the position detection sensor 32 with the protective cover 33 interposed therebetween can be changed. This configuration is very convenient since the single input device 1EX can be used not only as a normal game controller, but also as various controllers such as a flight simulator controller and a driving simulator controller.

In the case of the input device according to the second embodiment, the user does not need to purchase all of the plurality of operation part holding members such as the operation part holding members 341, 342, and 343 and just needs to purchase necessary operation part holding member(s) among them.

In the case of a conventional input device of this type, the user needs to purchase a plurality of input devices and appropriately switch them during use since it is difficult for the user to obtain an input device including all the operation parts that the user needs. By contrast, with the input device 1EX according to the second embodiment described above, the effects equivalent to purchasing a plurality of input devices can be obtained just by switching the operation part holding members.

In the input device 1EX according to the second embodiment, the method for acquiring the identification information for identifying each of the plurality of operation part holding members may employ various methods without limiting to the method of providing the identification information region for each operation part holding member and disposing, in the identification information region, the position indication coil that interacts with the position detection sensor 32, as described above. One method is to optically identify each of the plurality of operation part holding members. For example, a through hole is formed at a different predetermined position in each operation part holding member, and the circuit board 31 detects light through the through hole, so that the corresponding operation part holding member can be detected according to the position of the through hole through which the detected light passes.

In the input device 1EX according to the second embodiment, the acquisition of the correspondence table information and the detection apps for each of the plurality of operation part holding members 341, 342, and 343 is not necessarily performed automatically as described above. The user may recognize which of the operation part holding members 341, 342, and 343 has been mounted, input identification information for identifying the recognized operation part holding member, access the web server, acquire the correspondence table information and the detection apps for the mounted operation part holding member, and store the correspondence table information in the region storage device 211 of the operation information processing circuit 200 and install the detection apps as the per-region operation detection circuits 213 to 217.

In a conventional input device, since the arrangement of each operation part in a casing of the input device is also fixed, it is not easy to use for some users. However, since the input device according to the second embodiment is configured as described above, the user can operate in the operation mode as desired, and the operation parts can be disposed in the arrangement desired by the user.

The user may select various specifications of the operation part holding members prepared by a manufacturing company, instead of considering the specifications of the operation part holding members by himself/herself and requesting them from the manufacturing company.

Other Examples of Operation Parts

In the embodiments described above, the finger insertion operation part 12 has been described as an example of the three-dimensional operation part that can be operated to be slid forward, backward, leftward, and rightward in the direction parallel to the upper surface of the operation part holding member and that can be moved in the height direction. However, the three-dimensional operation part of this type is not limited to the above-described example and may have, for example, a configuration of a palm-held operation part 16 illustrated in FIGS. 14A to 14C.

Figure 14A:
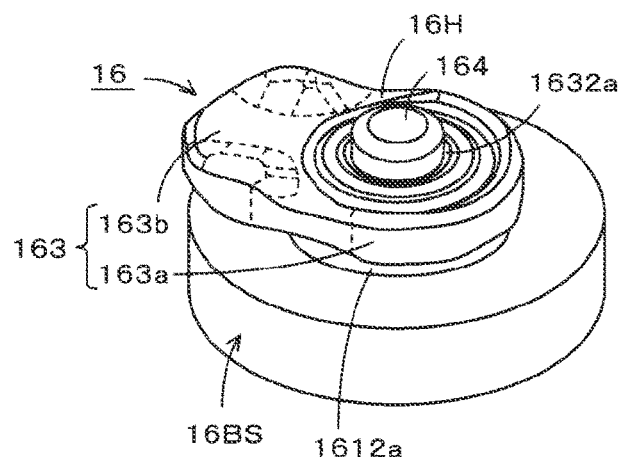
FIGS. 14A to 14C are views for describing an example of the operation part used in the input device according to an embodiment of the present disclosure.
Figure 14C:
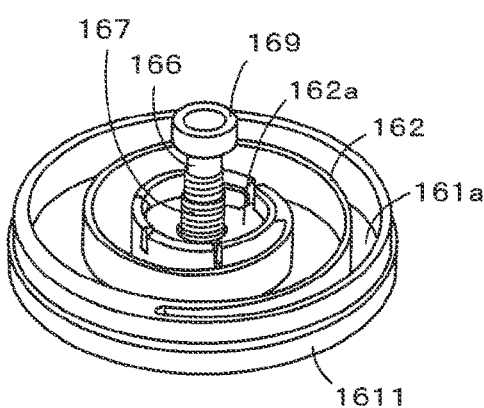
Figure 14B:
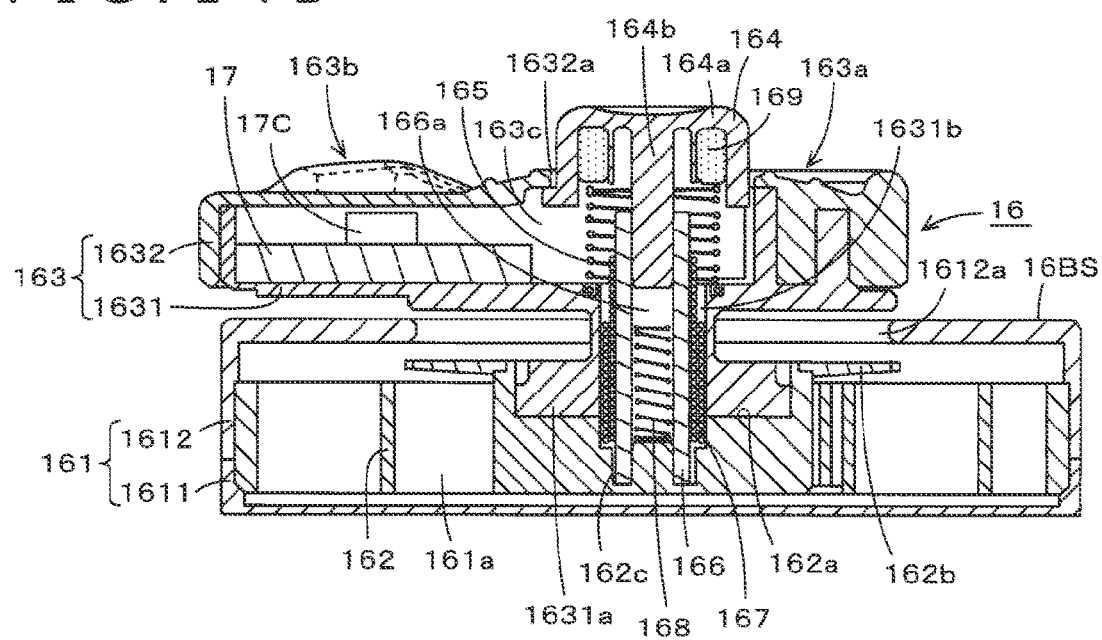

FIGS. 14A to 14C are views for describing an example of a configuration of the palm-held operation part 16. Specifically, FIG. 14A is a perspective view illustrating the appearance of the palm-held operation part 16. FIG. 14B is a longitudinal cross-sectional view thereof. FIG. 14C is a view for describing a return spiral spring 162 for returning an operation element 16H of the palm-held operation part 16 to the original state after the operation element 16H of the palm-held operation part 16 is operated to slidingly move forward, backward, leftward, or rightward.

As illustrated in FIGS. 14A and 14B, the palm-held operation part 16 according to this example includes an operation element holder 16BS and the operation element 16H. The operation element holder 16BS is fixedly disposed in a recessed portion (not illustrated) for the palm-held operation part 16 disposed on the operation part holding member. The operation element 16H is coupled to the operation element holder 16BS to be slidingly movable forward, backward, leftward, and rightward.

As illustrated in FIGS. 14A and 14B, the operation element holder 16BS includes a holder casing 161 which has a hollow, flat, cylindrical shape. The holder casing 161 includes a lower casing half 1611 which has a side wall on a circumference edge of a circular plate and an upper casing half 1612 which similarly has a side wall on a circumference edge of a circular plate. End surfaces of both of these side walls are joined such that they abut against each other.

The spiral spring 162 as illustrated in FIGS. 14B and 14C is disposed in a hollow portion 161c of the holder casing 161. In this case, the outermost circumferential side of the spiral spring 162 is fixed to the side walls of the lower casing half 1611 and the upper casing half 1612 of the holder casing 161 and is slightly separated from a bottom surface of the lower casing half 1611. Further, a central portion of the spiral spring 162 can freely and elastically be displaced, and after being displaced, the spiral spring 162 returns to its original state due to its own elastic biasing force.

An opening 1612a which has a predetermined radius from the center position of the upper surface of the upper casing half 1612 of the holder casing 161 is formed in the upper surface of the upper casing half 1612 of the holder casing 161. As described later, this opening 1612a is a movable range in which the operation element 16H slidingly moves forward, backward, leftward, and rightward. As illustrated in FIG. 14B, the spiral spring 162 is disposed at a position where a central portion of the spiral spring 162 is directly below the opening 1612a of the upper casing half 1612 of the holder casing 161. In addition, as illustrated in FIG. 14B, in order to prevent the spiral spring 162 from being detached from the opening 1612a of the holder casing 161, the spiral spring 162 includes a detachment prevention flange 162b which has an outer circumferential diameter larger than a diameter of the opening 1612a.

As illustrated in FIGS. 14A and 14B, an operation element casing 163 of the operation element 16H of the palm-held operation part 16 according to this example has an appearance shape in which a cylindrical portion 163a and a projecting portion 163b are integrated with each other. A sidewall surface of a semicircular portion of the cylindrical portion 163a projects by a predetermined length in a radial direction of the cylindrical portion 163a, forming the projecting portion 163b. With this shape, when the user performs an operation such as a sliding movement operation, the user can put a palm of a hand over the cylindrical portion 163a of the operation element 16H and pinches and holds the projecting portion 163b between a thumb and a forefinger.

In this example, the operation element casing 163 includes a lower casing portion 1631 and an upper casing portion 1632 which is positioned above the lower casing portion 1631 and fitted thereto. The operation element casing 163 has a hollow portion 163c inside.

Further, as illustrated in FIG. 14B, a coupling fixing portion 1631a is disposed below the cylindrical portion 163a of the lower casing portion 1631 of the operation element casing 163. The coupling fixing portion 1631a projects to be fitted to the central portion of the spiral spring 162, which is disposed in the holder casing 161. Further, as illustrated in FIGS. 14B and 14C, a recessed portion 162a to which the coupling fixing portion 1631a of the lower casing portion 1631 of the operation element casing 163 is fitted is formed in the central portion of the spiral spring 162. As illustrated in FIG. 14B, the coupling fixing portion 1631a of the lower casing portion 1631 of the operation element casing 163 is fitted to the recessed portion 162a of the spiral spring 162, so that the operation element 16H is fixed to the operation element holder 16BS.

In the present embodiment, as illustrated in FIG. 14B, the position of the lower casing portion 1631 of the operation element casing 163 facing the opening 1612a of the upper casing half 1612 of the holder casing 161 has a smaller diameter than the other portions (the center of the diameter is the center of the cylindrical portion 163a). Therefore, the operation element 16H can move in any direction perpendicular to the axial direction of the cylindrical holder casing 161 together with the spiral spring 162 within the range of the circular opening 1612a of the upper casing half 1612 of the holder casing 161. In other words, the operation element 16H can slidingly move not only forward, backward, leftward, and rightward, but also in an oblique direction. Further, the operation element 16H can slidingly move in an arc. When the user releases the sliding movement force on the operation element 16H, the operation element 16H returns to its original state (position) due to the elastic biasing force of the spiral spring 162.

Further, in a central portion of the cylindrical portion 163a of the upper casing portion 1632 of the operation element casing 163 of the palm-held operation part 16 according to this example, an opening 1632a which has a predetermined radius centering on the center position of the central portion of the cylindrical portion 163a is formed. The operation element 16H includes an operation button 164 which is disposed such that a push operation part 164a projects through this opening 1632a.

In this case, as illustrated in FIG. 14B, a coil spring 165 is disposed between the lower casing portion 1631 of the operation element casing 163 and the operation button 164, and the operation button 164 is configured to be always elastically biased by the coil spring 165 such that the push operation part 164a projects from the opening 1632a.

In the present embodiment, as illustrated in FIG. 14B, a through hole 1631b which has a predetermined diameter is formed at the center position of the cylindrical portion 163a of the lower casing portion 1631 of the operation element casing 163. A position indication coil 167 which is wound around a magnetic core such as a ferrite core 166 is disposed in the through hole 1631b. Further, as illustrated in FIG. 14B, in this example, a fitting hole 162c into which the ferrite core 166 is fitted is formed in the bottom of the recessed portion 162a in the central portion of the spiral spring 162. In the state in which the ferrite core 166 is fitted into the fitting hole 162c, the ferrite core 166 around which the position indication coil 167 is wound is locked so as not to move in the axial direction.

In this example, as illustrated in FIG. 14B, a through hole 166a which extends in the axial direction is formed in the ferrite core 166. The operation button 164 includes a projecting portion 164b which is inserted into the through hole 166a of the ferrite core 166. A coil spring 168 is disposed in the through hole 166a of the ferrite core 166. The coil spring 168 is configured such that, when the operation button 164 is pressed deeply by a predetermined length or more against the elastic biasing force of the coil spring 165, the coil spring 168 is engaged with the projecting portion 164b of the operation button 164 and elastically biases the operation button 164.

That is, when the operation button 164 is pressed by a length shorter than the predetermined length, only the coil spring 165 elastically contributes to the pressing operation of the operation button 164. When the operation button 164 is pressed by a length longer than the predetermined length, not only the coil spring 165 but also the coil spring 168 elastically contribute to the pressing operation of the operation button 164. In the present embodiment, the coil spring 165 has a small spring coefficient, while the coil spring 168 has a large spring coefficient. In this way, the coil springs having different spring coefficients are used as coil springs that contribute to the elastic bias of the operation button 164. With this configuration, when the position detection circuit 100 sets a threshold value for the pressing of the operation button 164 such that the pressing of the operation button 164 can be detected in, for example, two stages, it is possible to vary the feel of pressing of the operation button 164 according to the threshold value.

Moreover, as illustrated in FIGS. 14B and 14C, a magnetic body, in this example, a ring-shaped ferrite 169 is disposed within the operation button 164 of the palm-held operation part 16 according to this example. In this case, the ferrite 169 is disposed such that, when the operation button 164 is pressed, the ferrite 169 moves in the pressing direction accordingly.

As illustrated in FIG. 14B, a circuit board 17 is disposed in the hollow portion 163c of the operation element casing 163 of the operation element 16H. The position indication coil 167 and a capacitor 17C are connected in parallel to each other on the circuit board 17, thereby forming a resonant circuit.

The palm-held operation part 16 in the example of FIGS. 14A to 14C is configured as described above. Therefore, when the palm-held operation part 16 is placed on the operation part holding member disposed on the position detection sensor 32 with the protective cover 33 interposed therebetween, the position detection circuit 100, which is connected to the position detection sensor 32, detects the indication position of the position indication coil 167, which is wound around the ferrite core 166, as with the operation parts in the above-described embodiments.

When the user holds the operation element 16H and slidingly moves the operation element 16H in any direction, the position detection circuit 100 detects, through the position detection sensor 32, a change in the indication position of the position indication coil 167 corresponding to the sliding movement.

Further, when the operation button 164 of the operation element 16H is pressed, the positional relation in the height direction between the ferrite 169 and the position indication coil 167 changes in response to the pressing operation. Therefore, the inductance of the position indication coil 167 changes. As a result, the resonant frequency of the resonant circuit including the position indication coil 167 and the capacitor 17C changes. Therefore, the position detection circuit 100 can detect the height position of the operation button 164 by detecting the frequency change (phase change) of a signal received from the palm-held operation part 16. That is, since the palm-held operation part 16 according to this example is configured as described above, the height position of the operation button 164 can be detected without providing a pressure detector.

In this case, one or more threshold values can be set for changes in the resonant frequency to be detected by the position detection circuit 100, so that it is possible to obtain a plurality of detection outputs regarding the height position.

In the example of the configuration of the palm-held operation part 16 described above, the ferrite 169 is disposed above the position indication coil 167. Alternatively, the ferrite 169 may be disposed below the position indication coil 167 as long as the positional relation in the height direction between the ferrite 169 and the position indication coil 167 can be changed to correspond to the pressing operation of the operation button 164 of the operation element 16H.

Further, as with the embodiments described above, the above-described correspondence table information for the palm-held operation part 16 is stored in the region storage device 211 of the operation information processing circuit 200, which is connected to the position detection circuit 100, and the detection apps for the operation modes that can be accepted by the palm-held operation part 16 are installed as the per-region operation detection circuits. Accordingly, as with the examples described above, the operation information processing circuit 200 can generate a control signal set for the palm-held operation part 16.

Other Embodiments or Other Modifications

Although the input device according to the above-described embodiments is an example of the case where the input device includes the plurality of types of operation input acceptance parts, it goes without saying that the embodiments can also similarly be applied to the case where the input device includes one type of operation input acceptance part. In the case of providing a plurality of operation parts, it is possible to provide an input device in which each operation part can be disposed at any position on a position detection sensor and the user can easily set and change each operation part to the position the user desires.

Further, although the operation part holding members and the position detection sensor have a planar (flat plate) shape in the embodiments described above, the operation part holding members and the position detection sensor may have a folded portion or have a round shape such as a shape with a bent surface, a dome-shaped round shape, or a curved shape, without limiting to the planar (flat plate) shape.

Further, in the embodiments described above, the resonant frequencies, which are constituted by the respective position indication coils and capacitors disposed in the operation input acceptance parts, vary among the position indication coils. However, since the position of each position indication coil is fixed, it is possible to detect which position indication coil it is, according to the coordinate position detected by the position detection sensor. By utilizing this, the resonant frequencies constituted by the position indication coils and the capacitors may be common (the same).

Further, as described above, different types of operation input acceptance parts occupy different detection regions on the position detection sensor. Therefore, each detection region may be detected as a coordinate region range on the position detection sensor, and the resonant frequencies may vary among the plurality of position indication coils included in each operation input acceptance part.

Further, although the input device according to the embodiments described above uses the position detection sensor and the position detection circuit of the electromagnetic induction type, the input device may use a position detection sensor and a position detection circuit of a capacitance type. Specifically, the position indicator of each operation part may include a conductor, and the position of this conductor on the position detection sensor may be detected based on the interaction through capacitive coupling between the position detection sensor and the conductor. The height position of the conductor, which is the position indicator of each operation part, can be detected according to the signal level obtained from the position detection sensor through interaction.

It is noted that the conductor can be formed as a rod-shaped member and that a through hole penetrating a tip of the rod-shaped member can be formed in a bottom surface of a recessed portion of an operation part holding member in which a corresponding operation part is disposed. This configuration can increase capacitive coupling between the position detection sensor and the conductor.

In the case of an active capacitance type, a signal generation circuit that generates a signal to be transmitted from the conductor is disposed in each operation part, and the input device includes a power source that supplies a driving voltage to this signal generation circuit.

It should be understood by those skilled in the art that various modifications, combinations, sub-combinations and alterations may occur depending on design requirements and other factors insofar as they are within the scope of the appended claims or the equivalents thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An input device comprising:
   a position detection sensor of an electromagnetic induction type;
   a plurality of operation parts respectively including a plurality of position indicators that, in operation, respectively indicate a plurality of positions through a plurality of interactions with the position detection sensor and accepts a plurality of predetermined operations, the operation parts being disposed on an input surface that serves as a position detection region of the position detection sensor;

an operation detection circuit that, in operation, detects the operations accepted by the operation parts, based on the interactions between the position indicators of the operation parts and the position detection sensor; and a control signal output circuit that, in operation, outputs a plurality of control signals corresponding to the operation detected by the operation detection circuit, wherein the position indicators of the operation parts include a plurality of coils of a plurality of resonant circuits including a plurality of capacitors and the coils, wherein the coils, in operation, are coupled with the position detection sensor through electromagnetic induction, wherein the plurality of resonant circuits respectively have a plurality of resonant frequencies that are different from each other, wherein the operation detection circuit, in operation, identifies the operation parts based on the resonant frequencies that are different from each other, wherein one of the operation parts, in operation, accepts an operation that changes a height position of one of the position indicators with respect to the input surface, wherein the one of the operation parts includes an operation element, a variable capacitor, a substrate coupled to an end surface of the operation element, a pressure transmission member that extends through a hole formed in the substrate, and an elastic member that, in operation, is elastically displaced when a pressing force is applied to the operation element and that returns the operation element to an original height position when the pressing force is no longer applied to the operation element, wherein one of the capacitors of one of the position indicators included in the one of the operation parts is electrically coupled in parallel with the variable capacitor, wherein the one of the capacitors is disposed on the substrate at a position that is different from a position of the hole formed in the substrate, wherein a capacitance of the one of the capacitors of the one of the position indicators included in the one of the operation parts, in operation, varies based on the pressing force applied to the operation element, wherein the operation detection circuit, in operation, detects a change in the capacitance of the capacitor of the one of the position indicators included in the one of the operation parts based on the operation accepted by the one of the operation parts, wherein the control signal output circuit, in operation, outputs a control signal corresponding to the change in capacitance of the capacitor of the one of operation parts that is detected by the operation detection circuit.

2. The input device according to claim 1, wherein:

one of the operation parts, in operation, accepts an operation that changes a coordinate position of one of the position indicators on the input surface in the position detection region, the operation detection circuit, in operation, detects the coordinate position of the one of position indicators on the input surface that changes based on the operation accepted by the one of the operation parts, and the control signal output circuit, in operation, outputs a control signal corresponding to the coordinate position of the one of the position indicators on the input surface that is detected by the operation detection circuit.

3. The input device according to claim 1, wherein:

one of the operation parts, in operation, accepts an operation mode that changes a coordinate position of one of the position indicators on the input surface in the position detection region, the operation detection circuit, in operation, detects the coordinate position of the one of the position indicators on the input surface and a change direction of the coordinate position that change based on the operation accepted by the one of the operation parts, and the control signal output circuit, in operation, outputs a control signal corresponding to the coordinate position of the one of the position indicators on the input surface and the change direction of the coordinate position that are detected by the operation detection circuit.

4. The input device according to claim 1, wherein:

one of the operation parts includes one of the position indicators housed in a casing disposed in an axial direction that intersects the input surface, and, in operation, accepts an operation that changes a tilt angle formed by the axial direction of the casing with respect to the input surface, the operation detection circuit, in operation, detects the tilt angle of the axial direction of the casing with respect to the input surface based on the operation accepted by the one of the operation parts, and the control signal output circuit, in operation, outputs a control signal corresponding to the tilt angle of the axial direction of the casing with respect to the input surface that is detected by the operation detection circuit.

5. The input device according to claim 1, wherein:

the operation parts, in operation, accepts an operation that rotates at least two of the position indicators about a predetermined coordinate position serving as a rotation center position in the position detection region of the position detection sensor, the operation detection circuit, in operation, detects an angle of rotation about the predetermined coordinate position serving as the rotation center position, based on the operation accepted by the operation parts, and the control signal output circuit, in operation, outputs a control signal corresponding to the angle of the rotation detected by the operation detection circuit.

6. The input device according to claim 1, wherein:

an operation part fixing member is configured to cover the input surface of the position detection sensor, and the operation parts are fixedly disposed on the position detection sensor by the operation part fixing member such that the position indicators, in operation, are displaceable according to an operation on the position detection sensor.

7. The input device according to claim 6, wherein the operation part fixing member to which the operation parts are fixed is separable from the position detection sensor.

8. The input device according to claim 7, wherein:

the operation part fixing member to which the operation parts are fixed is replaceable, and the input device further includes a circuit that, in operation, changes the operation detection circuit to an operation detection circuit corresponding to the operation parts fixed to a replaced operation part fixing member.

9. The input device according to claim 6, wherein the operation part fixing member is disposed on the position detection sensor with a sensor cover interposed between the operation part fixing member and the position detection sensor, the sensor cover covering the input surface of the position detection sensor.

10. The input device according to claim 6, wherein:
a through hole penetrating both the position detection sensor and the operation part fixing member is formed at a predetermined position of each of the position detection sensor and the operation part fixing member, and
a push button switch is disposed in the through hole.

11. The input device according to claim 1, wherein an operation part fixing member holds the coils on the position detection sensor such that the coils, in operation, are displaceable on the position detection sensor according to an operation.

12. The input device according to claim 1, wherein the plurality of operation parts is arranged on the position detection sensor such that each of the plurality of operation parts occupies a different one of a plurality of detection subregions of the position detection region of the position detection sensor.

13. The input device according to claim 12, wherein:
the operation detection circuit includes a plurality of operation detection circuits each corresponding to one of the plurality of detection subregions occupied by a corresponding one of the plurality of the operation parts, and
each of the plurality of operation detection circuits, in operation, detects one of the plurality of predetermined operations allocated to the corresponding one of the plurality of the operation parts.

14. The input device according to claim 12, wherein:
an operation part fixing member is configured to cover the input surface of the position detection sensor, and
each of the plurality of the operation parts is disposed and held in the operation part fixing member such that each of the plurality of operation parts occupies a different one of the plurality of detection subregions of the position detection region of the position detection sensor.

15. The input device according to claim 14, wherein:
the operation part fixing member holding the plurality of the operation parts is separable from the position detection sensor and is replaceable, and
the input device further includes a circuit that, in operation, changes a plurality of operation detection circuits to a different plurality of operation detection circuits each corresponding to one of the plurality of the operation parts held by a replaced operation part fixing member.

16. The input device according to claim 13, further comprising:
a position detection circuit that, in operation, detects coordinates of a position in the position detection region of the position detection sensor based on an interaction between the position detection sensor and one of the position indicators of a corresponding one of the plurality of the operation parts;
a region determination circuit that, in operation, determines one of the plurality of detection subregions occupied by the corresponding one of the plurality of the operation parts includes the coordinates of the position detected by the position detection circuit; and
a circuit that, in operation, selects an operation detection circuit, among the plurality of operation detection circuits, that corresponds to the one of the plurality of detection subregions determined by the region determination circuit.

17. The input device according to claim 14, further comprising:
a storage device including a correspondence storage table storing correspondence information regarding correspondence between range information of each of the plurality of detection subregions of the position detection region of the position detection sensor and each of a plurality of operation detection circuits, the plurality of detection subregions each being occupied by a corresponding one of the plurality of operation parts, the plurality of operation detection circuits each corresponding to an operation of the corresponding one of the plurality of the operation parts disposed in respective ones of the plurality of detection subregions,
wherein a region determination circuit, in operation, determines which of the plurality of detection subregions each occupied by the corresponding one of the plurality of operation parts includes coordinates of a position detected by a position detection circuit, by referring to the correspondence storage table, recognizes a corresponding one of the plurality of operation detection circuits, and performs control such that a recognized operation detection circuit detects the operation.

18. The input device according to claim 17, wherein contents stored in the correspondence storage table are rewritten according to replacement of the operation part fixing member.

* * * * *